(12) United States Patent
Wada

(10) Patent No.: US 9,979,892 B2
(45) Date of Patent: May 22, 2018

(54) ZOOM LENS AND IMAGE PICKUP APPARATUS HAVING THE SAME

(71) Applicant: CANON KABUSHIKI KAISHA, Tokyo (JP)

(72) Inventor: Ken Wada, Sakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 303 days.

(21) Appl. No.: 14/507,633

(22) Filed: Oct. 6, 2014

(65) Prior Publication Data

US 2015/0097995 A1    Apr. 9, 2015

(30) Foreign Application Priority Data

Oct. 7, 2013 (JP) .................................. 2013-210034

(51) Int. Cl.
   *G02B 15/173* (2006.01)
   *H04N 5/232* (2006.01)

(52) U.S. Cl.
   CPC ....... *H04N 5/23296* (2013.01); *G02B 15/173* (2013.01)

(58) Field of Classification Search
   None
   See application file for complete search history.

(56) References Cited

U.S. PATENT DOCUMENTS

| | | | | |
|---|---|---|---|---|
| 5,745,300 A | * | 4/1998 | Usui | G02B 15/173 359/684 |
| 6,246,832 B1 | * | 6/2001 | Terada | G02B 7/285 359/676 |
| 6,512,637 B1 | | 1/2003 | Tomita | |
| 2003/0007256 A1 | * | 1/2003 | Usui | G02B 15/173 359/686 |
| 2006/0238891 A1 | * | 10/2006 | Ogata | G02B 15/173 359/690 |
| 2010/0214667 A1 | * | 8/2010 | Hayakawa | G02B 15/173 359/683 |

FOREIGN PATENT DOCUMENTS

| | | |
|---|---|---|
| JP | 2000-105336 A | 4/2000 |
| JP | 2012-113139 A | 6/2012 |

* cited by examiner

*Primary Examiner* — Ricky Mack
*Assistant Examiner* — Gary O'Neill
(74) *Attorney, Agent, or Firm* — Canon USA Inc., IP Division

(57) ABSTRACT

A zoom lens includes a front lens group having a first lens unit having a positive refractive power, a second lens unit having a negative refractive power, an aperture stop, and a rear lens group having a plurality of lens units. The first lens unit is fixed at the time of zooming, the first lens unit includes a first lens subunit having a negative refractive power, which is fixed at the time of focusing and a second lens subunit having a positive refractive power, which moves at the time of focusing. The second lens subunit is arranged at a position adjacent to the first lens subunit on the image side thereof, and the rear lens group includes a lens unit moving in a direction of an optical axis so that an imaging magnification at a telephoto end is larger than an imaging magnification at a wide-angle end.

11 Claims, 13 Drawing Sheets

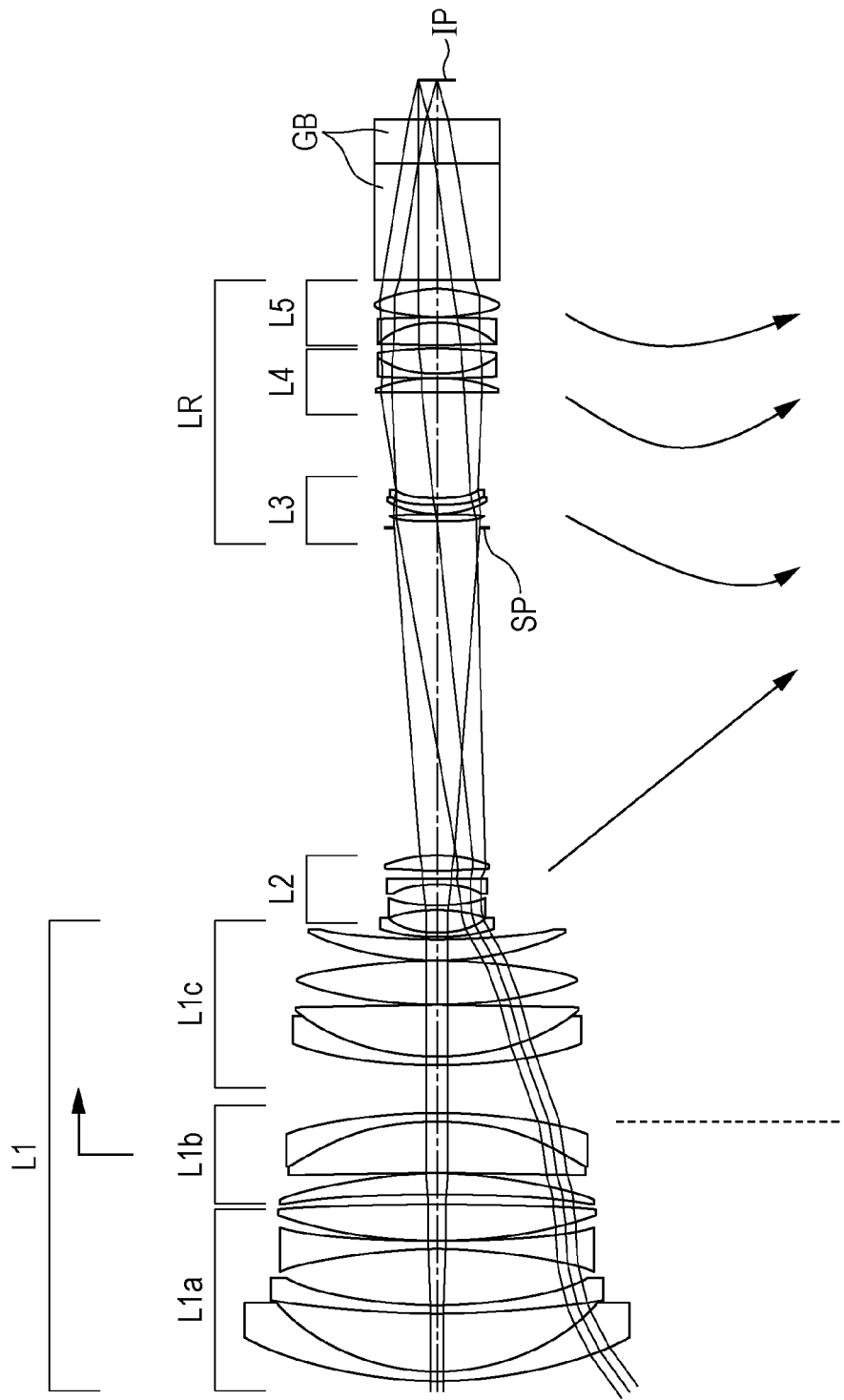

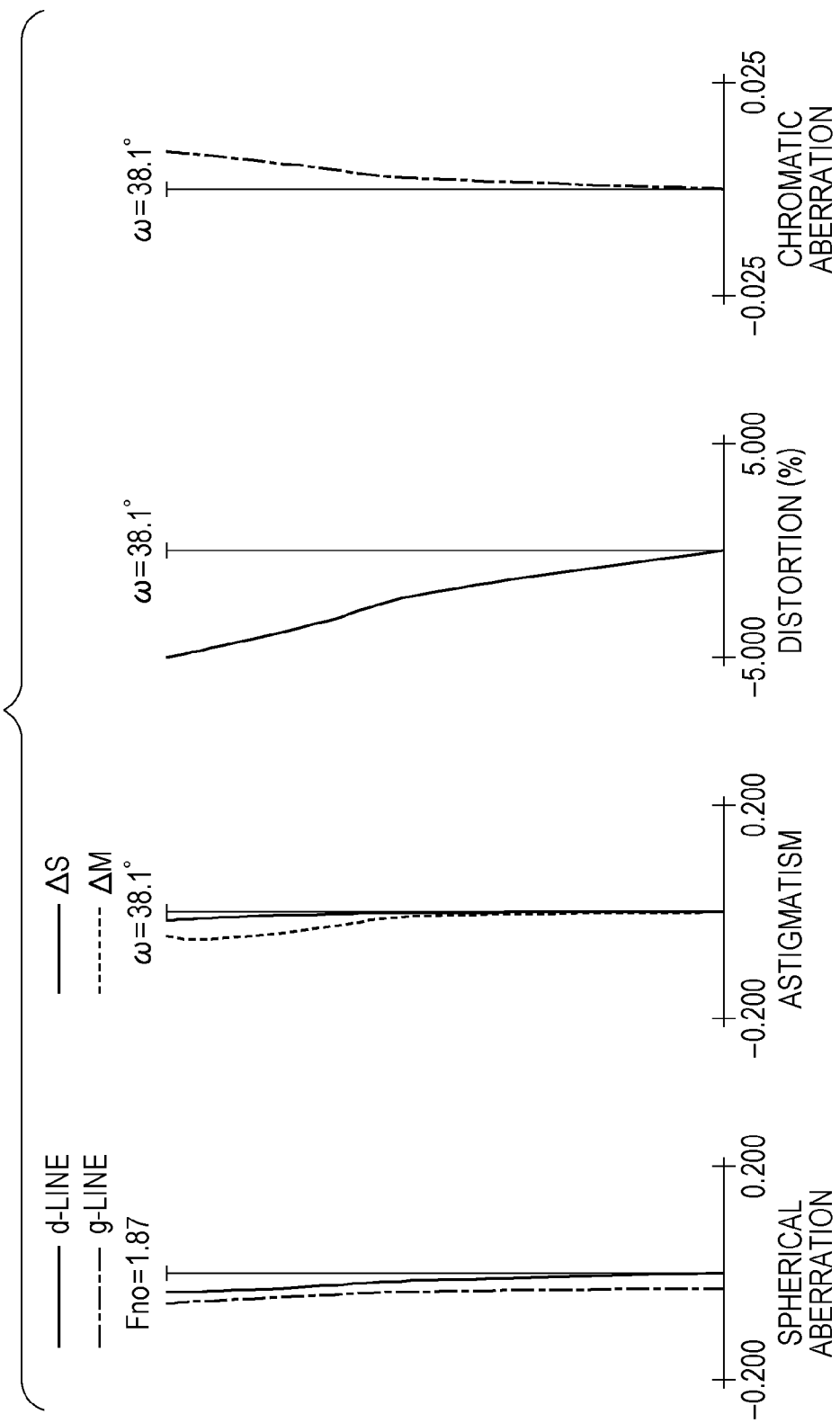

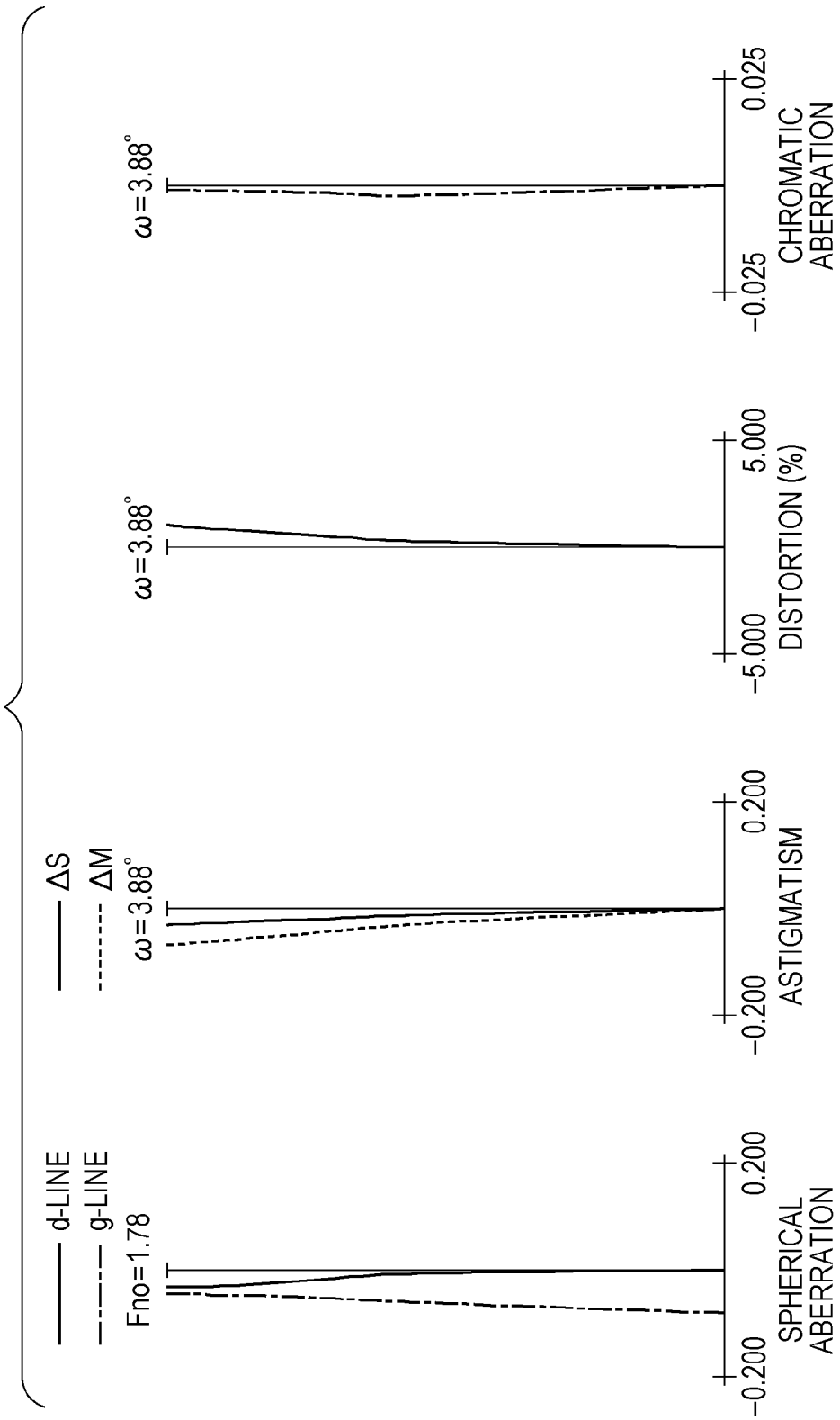

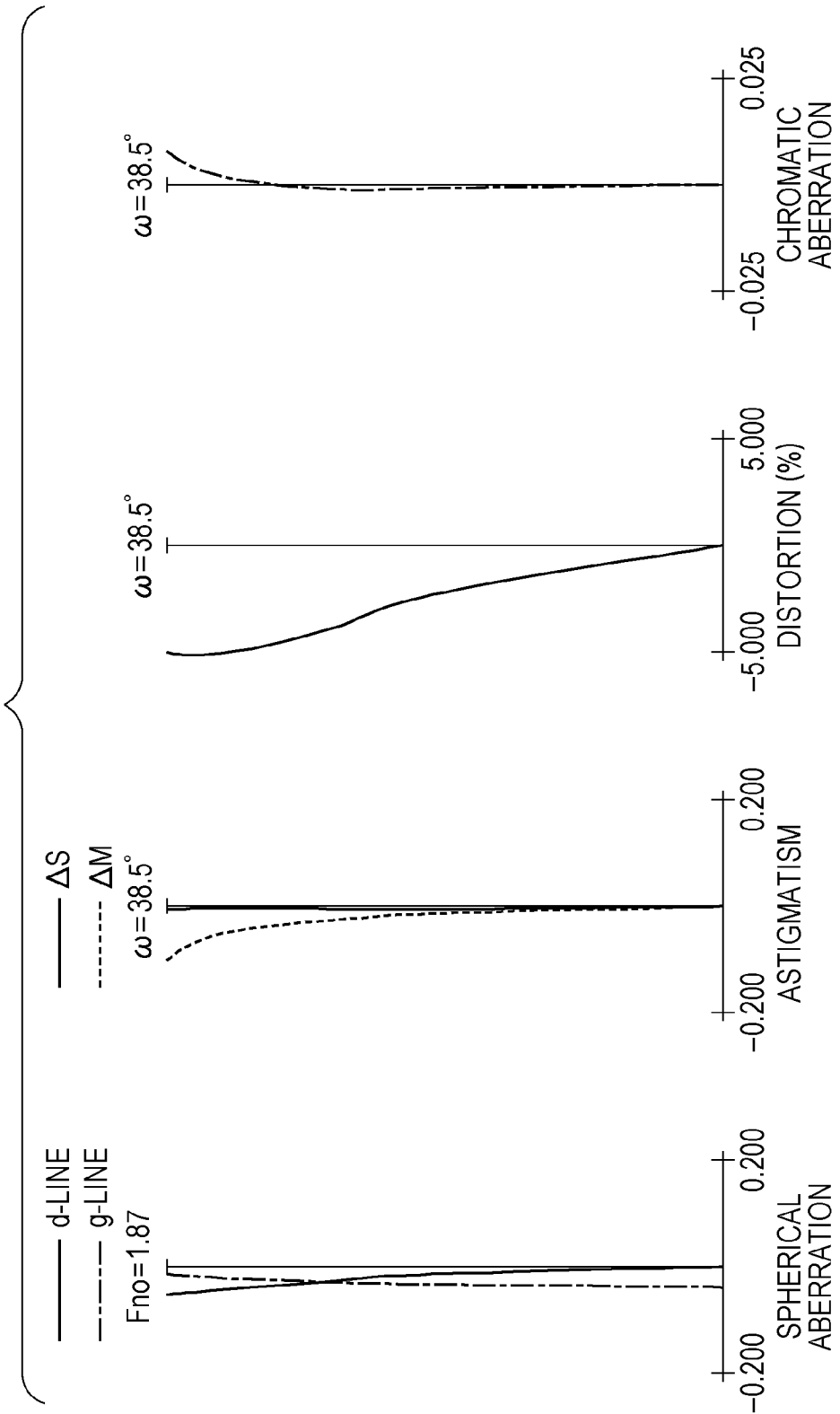

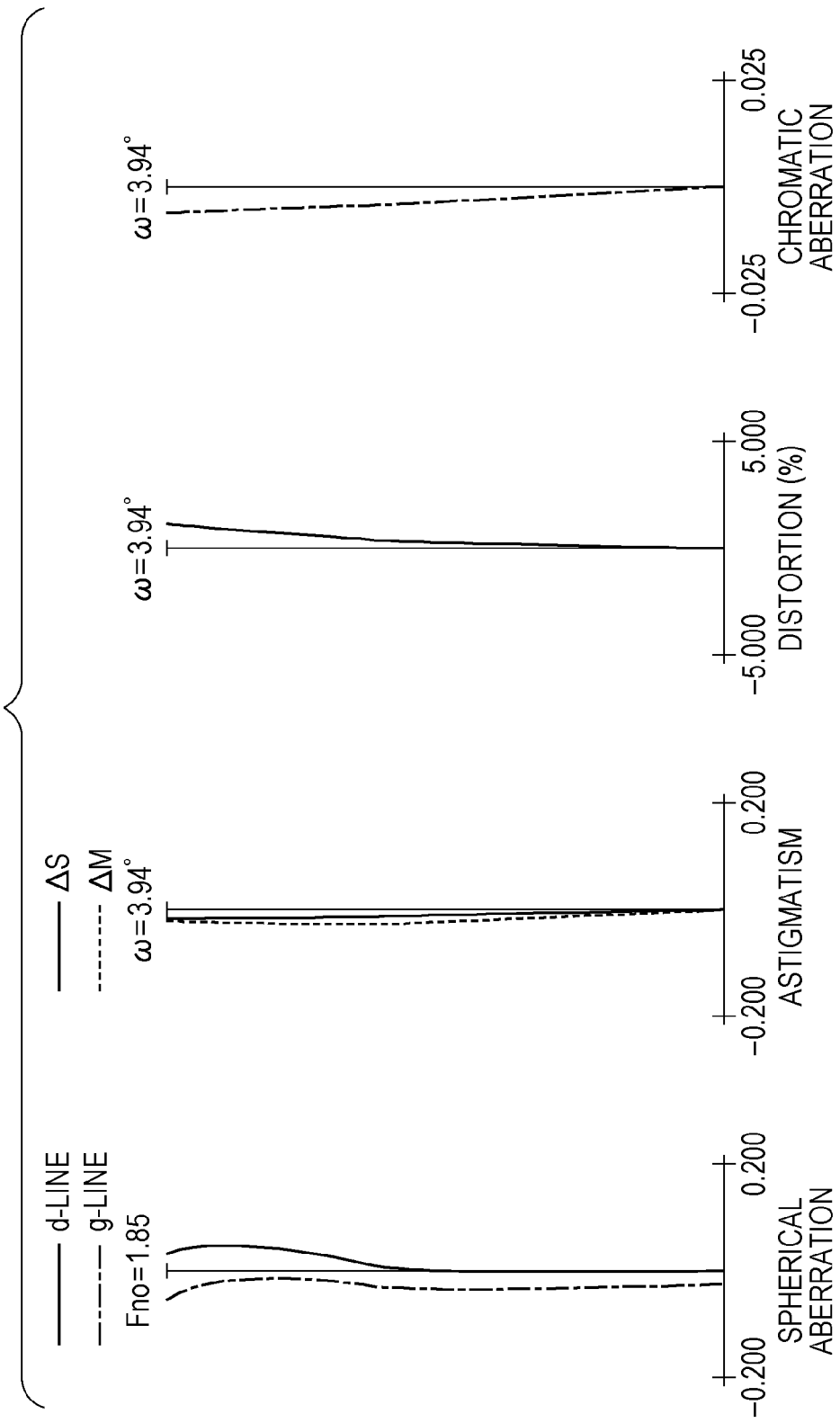

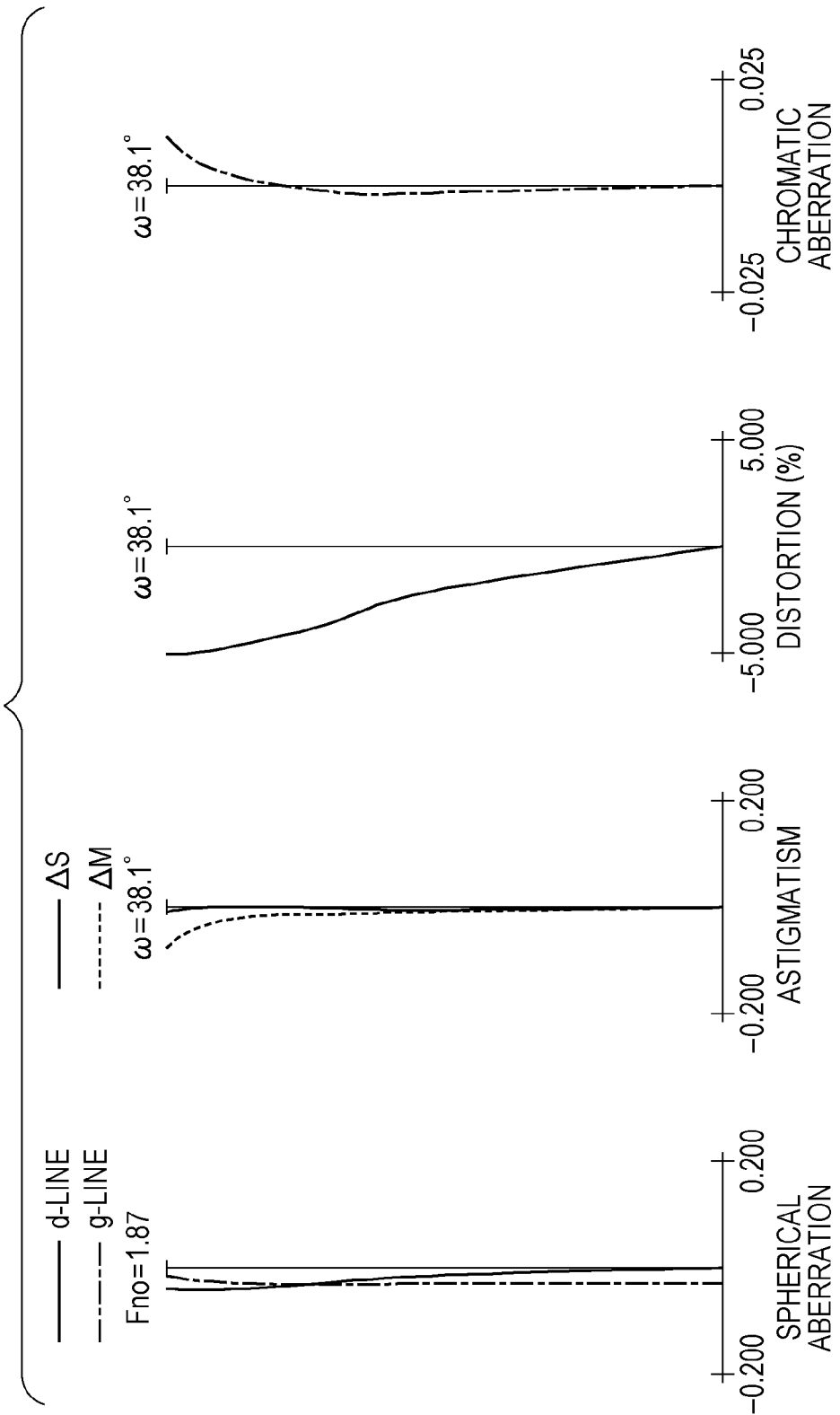

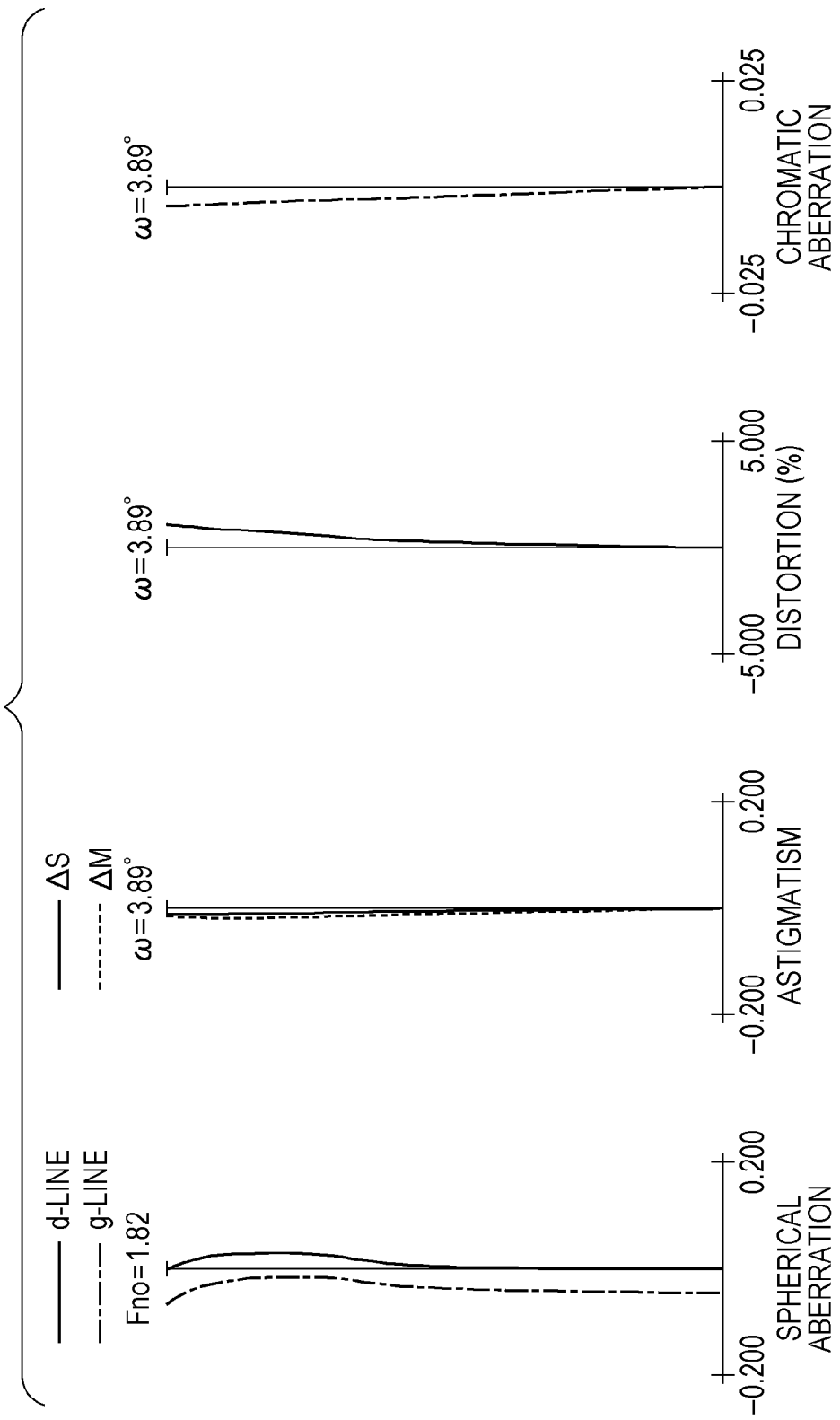

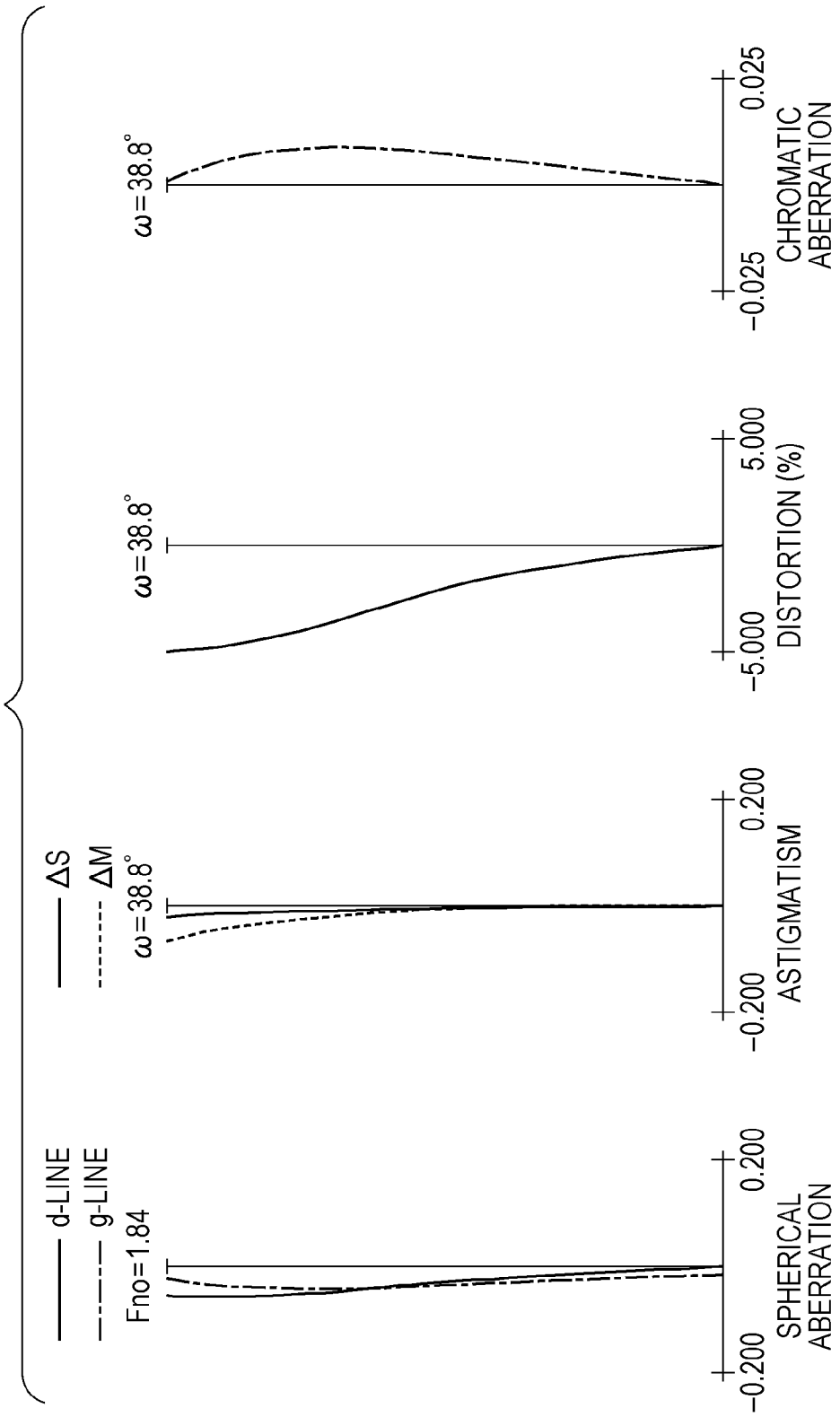

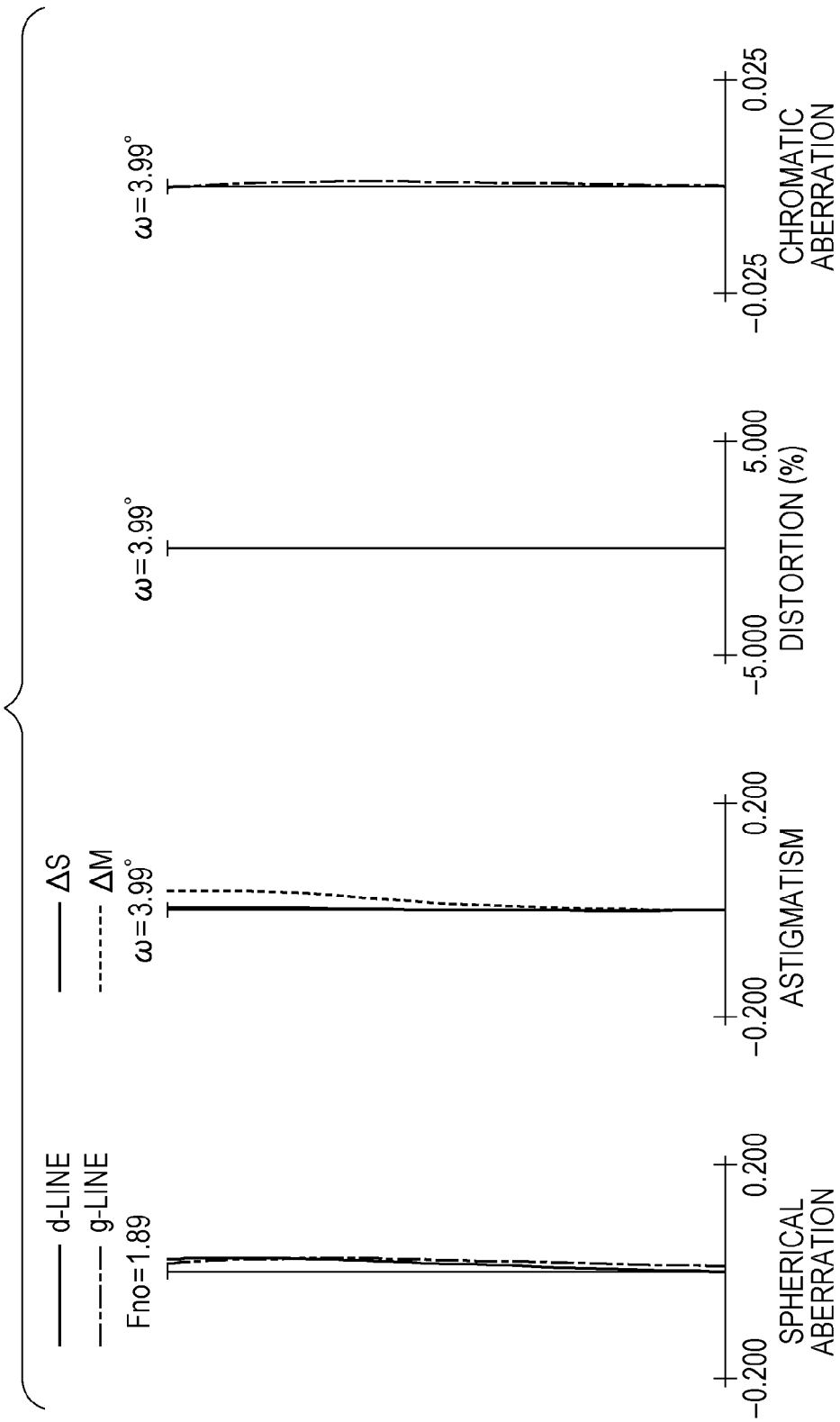

ZOOM LENS AND IMAGE PICKUP APPARATUS HAVING THE SAME

BACKGROUND OF THE INVENTION

Field of the Invention

This disclosure relates to a zoom lens and an image pickup apparatus having the zoom lens, and is suitable for image pickup apparatus using a solid-state image pickup element such as video cameras, electronic still cameras, broadcasting cameras, monitoring cameras or image pickup apparatus such as cameras using silver halide cameras.

Description of the Related Art

In recent years, the quality of output videos from an image pickup apparatus such as video cameras, or broadcasting TV cameras is high. A zoom lens used in these image pickup apparatus is required to have a high optical performance (resolution) corresponding to a super high vision (8K×4K) for example. In addition, the zoom lens is also required to have a fixed lateral magnification by focusing. In the related art, a positive lead type zoom lens including a lens unit having a positive refractive power arranged on the most object side is known.

A zoom lens disclosed in U.S. Pat. No. 6,512,637 includes a first lens unit having a positive refractive power, a second lens unit having a negative refractive power, a third lens unit, and a fourth lens unit having a positive refractive power in this order from an object side to an image side, and an aperture stop is arranged between the third lens unit and the fourth lens unit. At the time of zooming, the second and the third lens units move. The first lens unit includes a first lens subunit having a negative refractive power, a second lens subunit having a positive refractive power, and a third lens subunit having a positive refractive power, and the second lens subunit moves at the time of focusing from an object side to an image side. A zoom lens disclosed in Japanese Patent Laid-Open No. 2000-105336 includes first to fifth lens units having positive, negative, positive, negative, and positive refractive power in this order from the object side to the image side, and an aperture stop is arranged between the second lens unit and the third lens unit. At the time of zooming, the second lens unit on the object side with respect to the aperture stop and the fourth lens unit on the image side with respect to the aperture stop move. At the time of focusing, the fourth lens unit moves.

SUMMARY OF THE INVENTION

A zoom lens of this disclosure includes, from an object side to an image side, a first lens unit having a positive refractive power, a second lens unit having a negative refractive power, an aperture stop, and a rear lens group having a plurality of lens units in this order, wherein the interval between the lens units adjacent to each other varies at the time of zooming, and the first lens unit is fixed at the time of zooming, the first lens unit includes a first lens subunit having a negative refractive power, which is fixed at the time of focusing and a second lens subunit having a positive refractive power, which moves at the time of focusing in this order from the object side to the image side, and the rear lens group includes a lens unit moving in a direction of an optical axis so that an imaging magnification at a telephoto end is larger than an imaging magnification at a wide-angle end.

Further features of the present invention will become apparent from the following description of exemplary embodiments with reference to the attached drawings.

BRIEF DESCRIPTION OF THE DRAWINGS

FIG. 1 is a cross-sectional view of a zoom lens according to a first exemplary embodiment of the invention at a wide-angle end.

FIG. 2A is an aberration diagram of a zoom lens according to a first exemplary embodiment of the invention at the wide-angle end.

FIG. 2B is an aberration diagram of a zoom lens according to a first exemplary embodiment of the invention at a telephoto end.

FIG. 4A is an aberration diagram of a zoom lens according to a second exemplary embodiment of the invention at the wide-angle end.

FIG. 4B is an aberration diagram of a zoom lens according to a second exemplary embodiment of the invention at a telephoto end.

FIG. 6A is an aberration diagram of a zoom lens according to a third exemplary embodiment of the invention at the wide-angle end.

FIG. 6B is an aberration diagram of a zoom lens according to a third exemplary embodiment of the invention at a telephoto end.

FIG. 8A is an aberration diagram of a zoom lens according to a fourth exemplary embodiment of the invention at the wide-angle end.

FIG. 8B is an aberration diagram of a zoom lens according to a fourth exemplary embodiment of the invention at a telephoto end.

DESCRIPTION OF THE EMBODIMENTS

Hereinafter, embodiments of a zoom lens of this disclosure and an image pickup apparatus having the zoom lens will be described with reference to the attached drawings. The zoom lens of this disclosure includes, from an object side to an image side, a first lens unit having a positive refractive power, a second lens unit having a negative refractive power, and a rear lens group including a plurality of lens units on the most image side in this order. An aperture stop is provided on the object side of the rear lens group. An interval of the lens units adjacent to each other varies at the time of zooming.

At the time of zooming, the first lens unit is fixed, and the second lens unit and at least two lens units of the rear lens group move. The first lens unit includes a first lens subunit having a negative refractive power, a second lens subunit having a positive refractive power for focusing, and a third lens subunit having a positive refractive power in this order from the object side to the image side. The rear lens group includes a magnification increasing lens unit configured to move at the time of zooming from a wide-angle end to a telephoto end to increase an imaging magnification.

Figure 3:
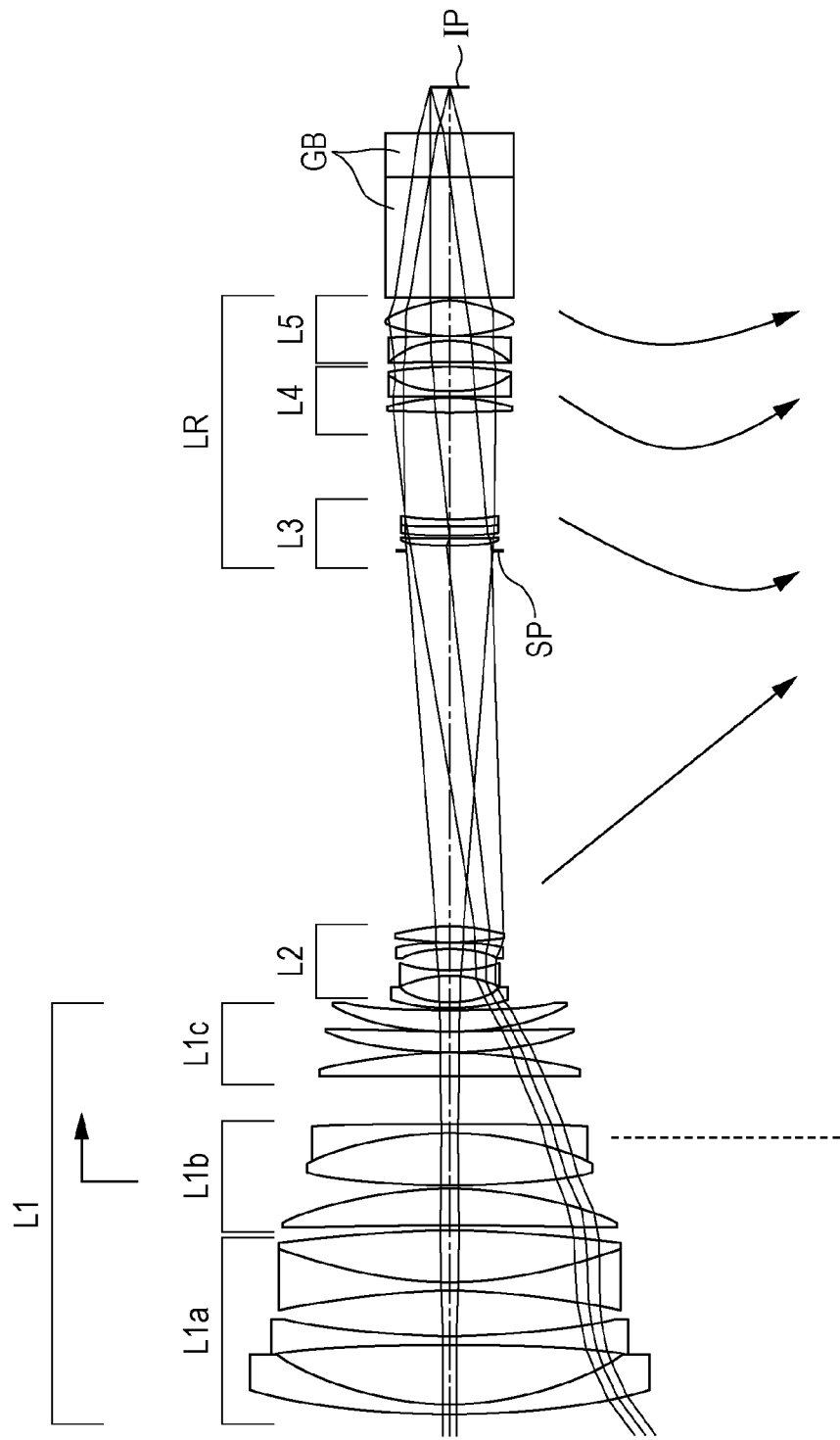
FIG. 3 is a cross-sectional view of a zoom lens according to a second exemplary embodiment of the invention at a wide-angle end.
Figure 5:
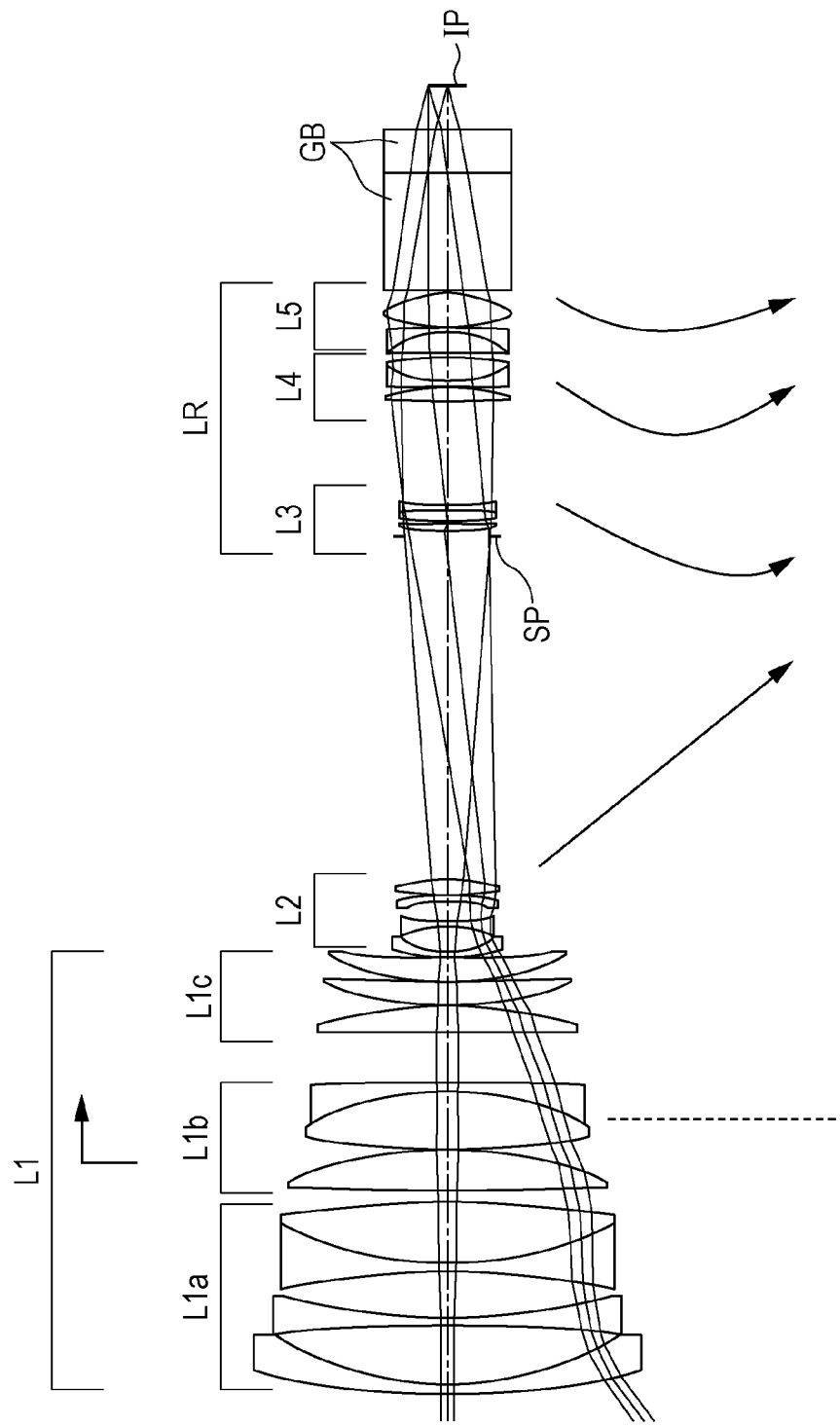
FIG. 5 is a cross-sectional view of a zoom lens according to a third exemplary embodiment of the invention at a wide-angle end.

FIG. 1 is a cross-sectional view of a zoom lens according to a first exemplary embodiment of the invention at a wide-angle end (short focal length end). FIGS. 2A and 2B are aberration diagrams at the wide-angle end and a telephoto end (long focal length end) of the zoom lens according to a first exemplary embodiment of the invention, respectively. FIG. 3 is a cross-sectional view of a zoom lens according to a second exemplary embodiment of the invention at a wide-angle end. FIGS. 4A and 4B are aberration diagrams at the wide-angle end and a telephoto end of the zoom lens according to a second exemplary embodiment of the invention, respectively. FIG. 5 is a cross-sectional view of a zoom lens according to a third exemplary embodiment of the invention at a wide-angle end. FIGS. 6A and 6B are aberration diagrams at the wide-angle end and a telephoto end of the zoom lens according to a third exemplary embodiment of the invention, respectively.

Figure 7:
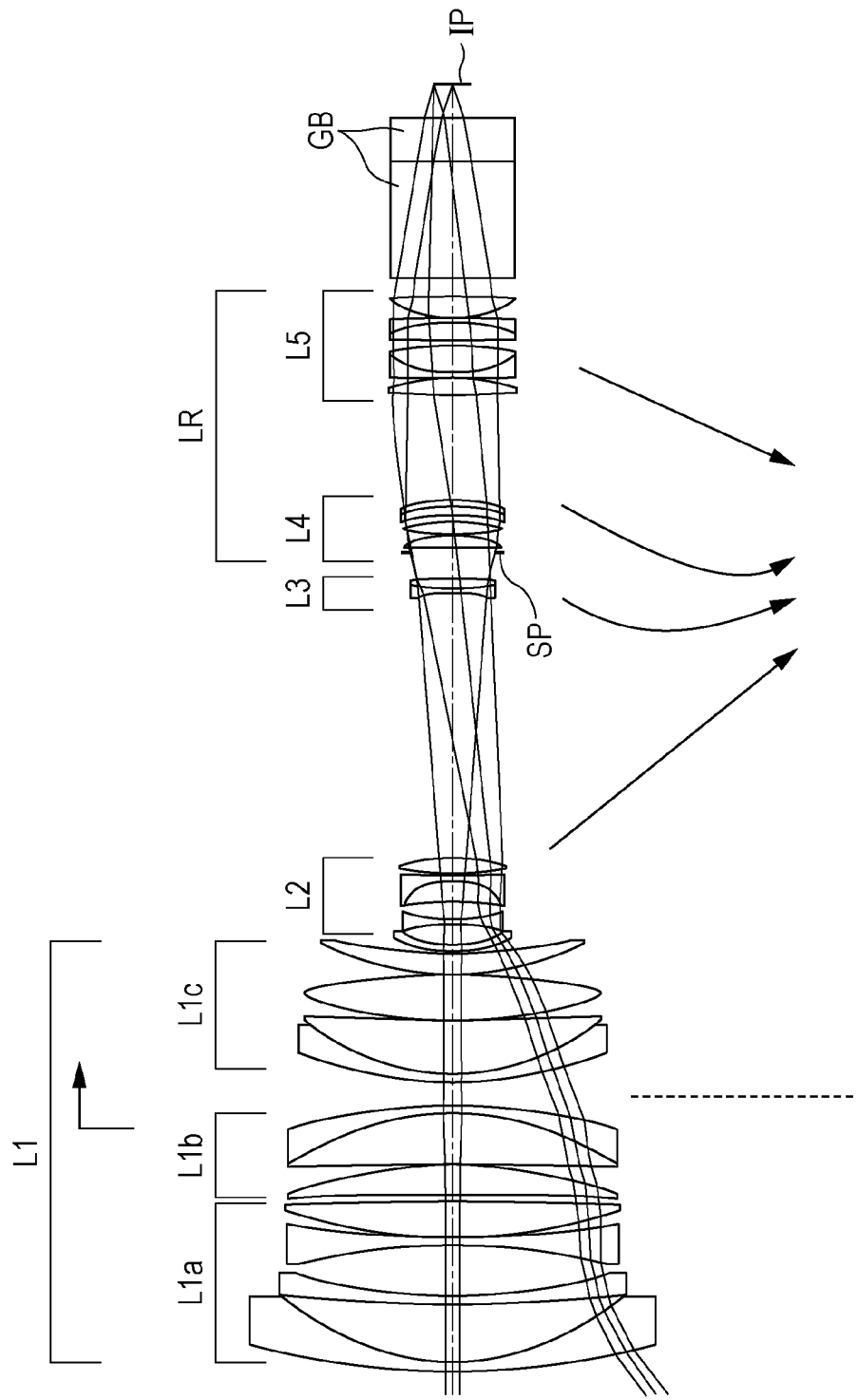
FIG. 7 is a cross-sectional view of a zoom lens according to a fourth exemplary embodiment of the invention at a wide-angle end.
Figure 9:
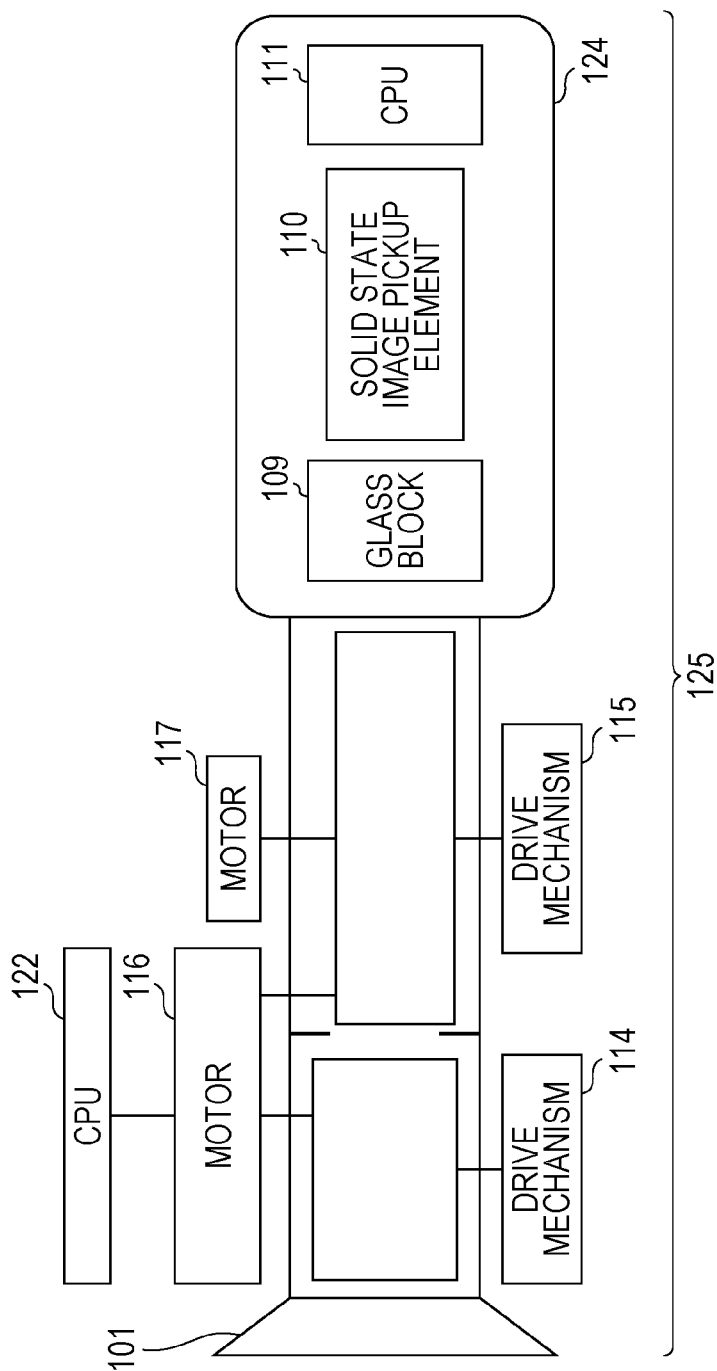
FIG. 9 is a schematic drawing of an image pickup apparatus of this disclosure.

FIG. 7 is a cross-sectional view of a zoom lens according to a fourth exemplary embodiment of the invention at a wide-angle end. FIGS. 8A and 8B are aberration diagrams at the wide-angle end and a telephoto end of a zoom lens according to a fourth exemplary embodiment of the invention, respectively. The lens cross-sectional view and the aberration diagrams illustrate a state when an object distance is infinity. FIG. 9 is a schematic drawing of TV camera (image pickup apparatus) as an example of the camera provided with a zoom lens of this disclosure. The zoom lens of the respective exemplary embodiments is an image taking lens system used in the image pickup apparatus such as the TV camera or the like. In the cross-sectional view of the lens, the left side corresponds to an object side (front side) and the right side is an image side (rear side).

Reference sign "i" indicates the order of the respective lens units from the object side to the image side, and reference sign Li denotes the i-th lens unit. Reference sign LR denotes a rear lens group having a plurality of lens units. Reference sign SP denotes an aperture stop which determines maximum diameter of an on-axis light flux at the wide-angle end. Here, the "aperture which determines maximum diameter of an on-axis light flux" indicates the aperture stop which determines an F number in an on-axis light flux (a light flux in which a principle ray proceeds along an optical axis) when the object distance is infinity.

In the lens cross-sectional views of exemplary embodiments 1, 2, and 3 illustrated in FIGS. 1, 3, and 5, L1 denotes a first lens unit having a positive refractive power (optical power=an inverse number of a focal length), L2 denotes a second lens unit having a negative refractive power, L3 denotes a third lens unit having a positive refractive power, and L4 denotes a fourth lens unit having a positive refractive power. L5 is a fifth lens unit having a positive refractive power. The rear lens group LR includes the third lens unit L3 having a positive refractive power, the fourth lens unit L4 having a positive refractive power, and the fifth lens unit L5 having a positive refractive power.

The first lens unit L1 includes a first lens subunit L1a having a negative refractive power, a second lens subunit L1b having a positive refractive power, and a third lens subunit L1c having a positive refractive power in this order from the object side to the image side. The aperture stop SP is positioned between the second lens unit L2 and the third lens unit L3. In other words, the aperture stop SP is arranged on the object side of the rear lens group LR. Reference sign GB denotes an optical block corresponding to a color split prism, an optical filter, or the like.

Reference sign IP denotes an image plane, where an image pickup surface of an image pickup element (photoelectric conversion element) such as a CCD sensor or a CMOS sensor is placed. The first lens unit L1 is fixed at the time of zooming. At the time of zooming from the wide-angle end to the telephoto end, the second lens unit L2 moves to the image side as indicated by an arrow. The third lens unit L3, the fourth lens unit L4, and the fifth lens unit L5 move independently from each other (along different loci) so as to draw loci convex toward the object side. The aperture stop SP moves along the same locus as the third lens unit L3.

In the lens cross-sectional view of a zoom lens according to an exemplary embodiment illustrated in FIG. 7, L1 denotes the first lens unit having a positive refractive power (optical power=an inverse number of a focal length), L2 denotes the second lens unit having a negative refractive power, L3 denotes the third lens unit having a positive refractive power, L4 denotes the fourth lens unit having a positive refractive power, and L5 denotes the fifth lens unit of a positive refractive power. The rear lens group LR includes the fourth lens unit L4 having a positive refractive power and the fifth lens unit L5 having a positive refractive power.

The first lens unit L1 includes the first lens subunit L1a having a negative refractive power, the second lens subunit L1b having a positive refractive power, and the third lens subunit L1c having a positive refractive power in this order from the object side to the image side. The aperture stop SP is positioned between the third lens unit L3 and the fourth lens unit L4. In other words, the aperture stop SP is arranged on the object side of the rear lens group LR. Reference sign GB denotes the optical block corresponding to the color split prism, the optical filter, or the like.

Reference sign IP denotes the image plane, where the image pickup surface of the image pickup element (photoelectric conversion element) such as the CCD sensor or the CMOS sensor is placed. The first lens unit L1 is fixed at the time of zooming. At the time of zooming from the wide-angle end to the telephoto end, the second lens unit L2 moves to the image side as indicated by an arrow. The third lens unit L3 and the fourth lens unit L4 move independently from each other (along different loci) so as to draw loci convex toward the object side. The fifth lens unit L5 moves to the object side. The aperture stop SP moves along the same locus as the fourth lens unit L4.

In the aberration diagram, ΔM and ΔS are a Meridional image plane, and a sagittal image line on a d line. Chromatic aberration of magnification (lateral chromatic aberration) is expressed by a g line. Fno denotes F number, and ω is a half angle of view. In the following exemplary embodiments, terms "wide angle end" and "telephoto end" are zoom positions when a variator lens unit is functionally positioned at both ends of a movable range on the optical axis.

In the exemplary embodiments, a so-called positive lead type zoom lens including the first lens unit L1 having a positive refractive power arranged at the most object side, and configured to vary the magnification by moving the second lens unit L2 having a negative refractive power arranged at a position adjacent to the first lens unit L1 as a variator lens unit is configured. In this configuration, achievement of high zoom ratio is facilitated.

In addition, with the first lens unit L1 having a lens configuration including the first lens subunit L1a having a negative refractive power, and the second lens subunit L1b having a positive refractive power in this order from the object side to the image side, a principle plane of the first lens unit is arranged on the image side, and an increase in refractive power of the second lens unit L2 is alleviated. Accordingly, significant refraction of a light at the second lens unit L2 is alleviated, so that occurrence of aberration is reduced. For example, variations such as aberration of curvature of field which occurs by the movement of the second lens unit L2 at the time of zooming is alleviated.

In the exemplary embodiments, the third lens subunit L1c having a positive refractive power, which is fixed at the time of focusing is provided on the image side of the second lens subunit L1b. Here, the lens subunit means an assembly of lenses including one or more lenses separated at lens intervals along the direction of the optical axis which may be varied at the time of focusing. In addition, magnification variations which may occur when focusing from the infinity to the closest position is restrained by focusing with second lens subunit L1b, which constitutes the first lens unit L1 to be arranged on the object side with respect to the second lens unit L2 having a variable magnification function.

In the zoom lenses of the exemplary embodiments, the rear lens group LR includes a magnification increasing lens unit (lens unit) having an auxiliary magnification increasing function in order to reduce the share of the zooming ratio of the second lens unit L2 and lower aberration sensitivity. In addition, an image plane variation correction lens unit (lens unit) having a compensator function that corrects variations in image plane position caused by the magnification variation is provided in an optical path. Furthermore, aberration variation at the time of zooming is reduced by providing an aberration correction lens unit that moves for reducing the aberration variation at the time of zooming. The aberration correction lens unit has a function of reducing an imaging magnification at the time of zooming from the wide-angle end to the telephoto end.

At the time of zooming from the wide-angle end to the telephoto end, the aperture stop SP is moved to the object side. With the provision of the rear lens group LR with the share of the zooming ratio, the drop of an F value (F number) in a telephoto range is restrained by moving the aperture stop SP to the object side. In this configuration, a zoom lens with a high zoom ratio having a high optical performance over the entire zoom range is obtained. In the exemplary embodiments, preferably, one or more of the following conditional expressions are satisfied.

At the time of zooming from the wide-angle end to the telephoto end, the aperture stop SP and a lens unit Ls arranged at a position adjacent to the aperture stop SP on the image side moves along the same locus convex toward the object side. The lens unit Ls of exemplary embodiments 1, 2, and 3 is the third lens unit L3, and that of exemplary embodiment 4 is the fourth lens unit L4. The amount of movement of the lens unit Ls at the time of zooming from the wide-angle end to a zoom position Zm where the lens unit Ls is positioned at the most object side is expressed as ms, and the amount of movement of the lens unit arranged on the image side of the lens unit Ls is expressed as mr. The variable magnification ratio of the rear lens group LR is expressed as Zr.

The second lens subunit includes a positive lens, a positive lens, and a negative lens arranged in this order from the object side to the image side, and a focal length of the second lens subunit is expressed as f1b, and a focal length of the first lens unit L1 is expressed as f1. A distance from the aperture stop SP to a front (anterior) principle plane position of the rear lens group LR is expressed as 0r1, and a focal length of the rear lens group LR is expressed as fr. At this time, at least one of the following conditional expressions is preferably satisfied.

$$1.07 < Zr < 1.70 \quad (1)$$

$$0.2 < mr/ms < 1.2 \quad (2)$$

$$1 < f1b/f1 < 5 \quad (3)$$

$$0.8 < 0r1/fr < 1.8 \quad (4)$$

When there are a plurality of the lens units arranged on the image side of the lens unit Ls, each of the plurality of lens units satisfies the conditional expression (2). The conditional expression (4) is to be satisfied over the entire zoom range from the wide-angle end to the telephoto end. The technical meaning of the respective conditional expressions described above will be described below.

The conditional expression (1) specifies the variable magnification ratio of the rear lens group LR. If the share of the zooming ratio of the rear lens group LR is too low beyond a lower limit value of the conditional expression (1), the aberration variation at the time of magnification variation by the variator lens unit (the second lens unit L2) is increased. When an attempt is made to reduce the size of the whole system at that time, a petzval sum is increased in a negative direction, and the curvature of field is exceeded (excess of correction) in the entire zoom range. In contrast, when the share of the zooming ratio exceeds the upper limit, the amount of movement of the lens unit for the magnification variation needs to be increased because the share of the zooming ratio of the rear lens group LR is too large, and hence the aberration variation in association with the zooming is increased. Consequently, the correction becomes difficult.

The conditional expression (2) relates to a ratio between the amount of movement of the lens unit Ls arranged at a position adjacent to the aperture stop SP on the image side in the direction of the optical axis and the amount of movement of the lens unit arranged on the image side of the lens unit Ls at the time of zooming.

Regardless the excess is beyond the upper limit or the lower limit of the conditional expression (2), each locus of the individual lens units on the image side of the lens unit Ls departs from the locus of the lens unit Ls. Consequently, the state of passage of an off-axis light beam to the rear lens units varies significantly at the time of zooming, and the aberration variation at the time of zooming is increased. For example, in the first exemplary embodiment, the lens unit Ls is the third lens unit L3, and the amount of movement of the third lens unit L3 becomes maximum with reference to the position of the wide-angle end at −18.6 mm (the sign "−" indicates the movement to the object side) at the intermediate zoom position.

At this time, the maximum amounts of movement of the fourth lens unit L4 and the fifth lens unit L5, which correspond to the rear lens units of the rear lens group LR are, −12.3 mm and −11.0 mm, respectively at the intermediate zoom position. Accordingly, the value of the conditional expression (2) falls within a range from 0.59 to 0.66. In this manner, since the locus which is prevented from significant departing from the movement locus of the lens unit Ls is employed, the variations in the state of passage mainly of the off-axis light beam to the respective lens units relating to the rear lens group LR are reduced, and the aberration variation at the time of zooming is reduced.

In the exemplary embodiments, the image plane variation correction lens unit (compensator lens unit) moves to correct the variations of image plane position with respect to the movement of the magnification increasing lens unit in the rear lens group LR. The aberration correction lens unit has an aberration correcting function, and move so as to reduce an imaging magnification at the time of zooming from the wide-angle end to the telephoto end. For example, the fourth lens unit L4 of the rear lens group LR corresponds to the magnification increasing lens unit in the first exemplary embodiment, and has a magnification increasing effect of approximately 1.3 times by moving at a lateral magnification of 1 or lower over the entire zoom range at the time of zooming from the wide-angle end to the telephoto end.

In contrast, the third lens unit L3 corresponds to the image plane variation correction lens unit, and moves so as to correct the variations in paraxial image plane position by moving in the same direction as the movement of the fourth lens unit L4 at a lateral magnification of 1 or higher over the entire zoom range.

The fifth lens unit L5 corresponds to the aberration correction lens unit, and moves substantially along the movement of the fourth lens unit L4. By keeping a substantially large interval between the fourth lens unit L4 and the fifth lens unit L5 in a zoom range from the intermediate to the telephoto end, variations which causes the curvature of field to be excessively generated in the zoom range from the intermediate to the telephoto end. In this case, although the movement of the fifth lens unit L5 results in a magnification decreasing effect of approximately 0.94 times, the fifth lens unit L5 is functioned as the aberration correction lens unit because a significant effect of correcting the curvature of field is obtained.

The lens configuration as described above desirably corrects variations of the characteristics caused by the movement of the magnification increasing lens unit having the magnification increasing effect that shares the zooming ratio of the variator lens unit for the rear lens group LR. The principle plane is moved to the image side by the first lens subunit L1a and the second lens subunit L1b, which are lens subunits constituting the first lens unit L1. In addition, the third lens subunit L1c having a positive refractive power, which is fixed at the time of focusing is arranged on the image side of the second lens subunit L1b.

With the provision of the third lens subunit L1c having a positive refractive power on the image side in addition to the configurations of the first lens subunit L1a and the second lens subunit L1b, the entire refracting power of the first lens unit L1 is increased, so that the variable magnification ratio is effectively secured. The second lens subunit L1b includes the positive lens, the positive lens, and the negative lens in this order from the object side to the image side in exemplary embodiments 1 to 4.

The conditional expression (3) specifies the ratio of the focal length of the second lens subunit L1b for focusing with respect to the focal length of the first lens unit L1. If the ratio exceeds the lower limit of the conditional expression (3), the refracting power of the second lens subunit L1b becomes too strong, and hence the aberration variation is increased at the time of focusing, and the correction becomes difficult. In contrast, if the ratio exceeds the upper limit, the amount of movement of the second lens subunit L1b at the time of focusing is increased, and the aberration variation at the time of focusing is increased correspondingly. As regards the zoom lens, the lens units arranged on the image side with respect to the lens unit Ls all have a positive refractive power. In other words, the lens units included in the rear lens group LR all have a positive refractive power.

A color separating element or the like is arranged between an image pickup optical system and the image pickup surface to pickup an image by using a plurality of image pickup elements by colors, so that an image with higher quality and high definition is obtained. In this configuration, a lens configuration considering the conditions relating to a pupil position especially on an outgoing side is desirable. In other words, an optical system having the pupil at a far position is desirable. Therefore, the lens units arranged on the image side with respect to the aperture stop SP preferably have a positive refractive power.

In the exemplary embodiments, all the lens units included in the rear lens group LR move at the time of zooming. Considering that the lens unit Ls is driven, the variations in pupil position may be restrained by other rear lens units driven therewith. Therefore, the aberration variation may be reduced easily. When a distance from the aperture stop SP to the front principle plane position of the rear lens group LR is expressed as 0r1 and the focal length of the rear lens group LR is expressed as fr, the conditional expression (4) is satisfied over the entire zoom range.

The conditional expression (4) specifies the ratio of the front principle plane position of the rear lens group LR with respect to the focal length of the rear lens group LR. Regardless the excess is beyond the upper limit or the lower limit of the conditional expression (4), the state of passage of the off-axis light beam to the rear lens group LR may vary significantly, or an incident angle of a light beam to a color separating surface of the color separating element may vary significantly by zooming disadvantageously. Further preferably, the range of numerical values of the conditional expressions (1) to (4) are set as follows.

$$1.07 < Zr < 1.50 \tag{1a}$$

$$0.3 < mr/ms < 1.0 \tag{2a}$$

$$2 < f1b/f1 < 4 \tag{3a}$$

$$0.9 < 0r1/fr < 1.5 \tag{4a}$$

Exemplary Embodiment 1

Referring now to FIG. 1, a zoom lens of Exemplary embodiment 1 of this disclosure will be described below. The zoom lens of Exemplary embodiment 1 is a zoom lens having a high zoom ratio and being mounted on image pickup cameras mainly for TV (for broadcasting apparatus). The zoom lens includes the first lens unit L1 having a positive refractive power, the second lens unit L2 having a negative refractive power, the aperture stop SP, the third lens unit L3 having a positive refractive power, the fourth lens unit L4 having a positive refractive power, and the fifth lens unit L5 having a positive refractive power in this order from the object side to the image side. The rear lens group LR includes the third lens unit L3 and the fifth lens unit L5. The third lens unit L3 corresponds to the lens unit Ls.

In this exemplary embodiment, the first lens unit L1 is fixed and all of the second lens unit L2 to the fifth lens unit L5 are movable at the time of zooming from the wide-angle end to the telephoto end. Accordingly, the aberration variation at the time of zooming is alleviated while securing a zoom ratio as high as 11.5, and hence a high optical performance is achieved.

The aperture stop SP is moved integrally with the third lens unit L3 (along the same locus) along the locus convex toward the object side at the time of zooming from the wide-angle end to the telephoto end. With the movement of the aperture stop SP, an image magnification of the aperture stop SP viewed from the object side is increased to prevent the F number (F value) in the telephoto range from becoming dark.

In the case where the aperture stop SP is moved integrally with the lens units, a lens unit which does not increase the magnification significantly is preferably selected. The first lens unit L1 includes the first lens subunit L1a having a negative refractive power, the second lens subunit L1b having a positive refractive power, and the third lens subunit L1c having a positive refractive power in this order from the object side to the image side. At the time of zooming, the second lens subunit L1b of the first lens unit L1 is moved and focusing is performed when the image pickup distance is changed. Therefore, a configuration with a small change in the zoom magnification (lateral magnification) when focusing from infinity to a point blank is achieved.

As regards the rear lens group LR, the fourth lens unit L4 has a magnification increasing effect of approximately 1.3 times at the time of zooming from the wide-angle end to the telephoto end. The third lens unit L3 moves so as to correct the deviation of the paraxial image plane position caused by the movement of the fourth lens unit L4. The fourth lens unit L4 and the fifth lens unit L5 move along loci, which is similar to that of the third lens unit L3, convex toward the object side at the time of zooming from the wide-angle end to the telephoto end with respect to the movement of the third lens unit L3 including the aperture stop SP. Accordingly, an increase in the curvature of field of the intermediate zoom range is alleviated.

In this exemplary embodiment, as regards the third lens unit L3, the amount of movement of the third lens unit L3 becomes maximum with reference to the position of the wide-angle end at −18.6 mm (the sign "−" indicates the movement to the object side) at the intermediate zoom position. The maximum amounts of movement of the fourth lens unit L4 and the fifth lens unit L5 are −12.3 mm and −11.0 mm, respectively, at the intermediate zoom position. The value of the conditional expression (2) at this time falls within a range from 0.59 to 0.66. In this manner, since the locus which is prevented from significant departing from the movement locus of the third lens unit L3 is employed, the aberration variation caused by the movement of the rear lens group LR is reduced.

Because of the movement of the rear lens units arranged on the image side with respect to the third lens unit L3, this exemplary embodiment is designed to satisfy the conditional expression (1)=1.08. A variable power of the second lens unit (variator lens unit) is borne. Accordingly, the aberration variation of the curvature of field at the time of zooming is reduced.

Exemplary Embodiment 2

Referring now to FIG. 3, a zoom lens of Exemplary embodiment 2 of this disclosure will be described below. The zoom type including the number or the refracting power of lens units, and the lens units that move at the time of zooming of Exemplary embodiment 2 is the same as that of the Exemplary embodiment 1. The configuration of the first lens unit L1 is the same as that of Exemplary embodiment 1. The lens configuration of the second lens subunit L1b for focusing is also the same as that of Exemplary embodiment 1. As regards the rear lens group LR, the fourth lens unit L4 has a magnification increasing effect of approximately 7.1 times at the time of zooming from the wide-angle end to the telephoto end. Optical actions of the respective lens units of the rear lens group LR are the same as those of Exemplary embodiment 1.

In this exemplary embodiment, as regards the third lens unit L3, the amount of movement of the third lens unit L3 becomes maximum with reference to the position of the wide-angle end at −46.4 mm (the sign "−" indicates the movement to the object side) at the intermediate zoom position. The maximum amounts of movement of the fourth lens unit L4 and the fifth lens unit L5 are −37.0 mm and −16.1 mm, respectively, at the intermediate zoom position. The value of the conditional expression (2) at this time falls within a range from 0.35 to 0.80. In this manner, since the locus which is prevented from significant departing from the movement locus of the third lens unit L3 is employed, the aberration variation caused by the movement of the rear lens group LR is reduced.

Because of the movement of the rear lens units arranged on the image side with respect to the third lens unit L3, this exemplary embodiment is designed to satisfy the conditional expression (1)=1.48, and the variable power of the second lens unit (variator lens unit) is borne. Accordingly, the aberration variation of the curvature of field at the time of zooming is reduced. Other points are the same as those of Exemplary embodiment 1.

Exemplary Embodiment 3

Referring now to FIG. 5, a zoom lens of Exemplary embodiment 3 of this disclosure will be described below. The zoom type of Exemplary embodiment 3 is the same as that of Exemplary embodiment 1. The configuration of the first lens unit L1 is the same as that of Exemplary embodiment 1. The lens configuration of the second lens subunit L1b for focusing is also the same as that of Exemplary embodiment 1. As regards the rear lens group LR, the fourth lens unit L4 has a magnification increasing effect of approximately 1.5 times at the time of zooming from the wide-angle end to the telephoto end. The optical actions of the respective lens units of the rear lens group LR are the same as those of Exemplary embodiment 1.

In this exemplary embodiment, as regards the third lens unit L3, the amount of movement of the third lens unit L3 becomes maximum with reference to the position of the wide-angle end at −36.0 mm (the sign "−" indicates the movement to the object side) at the intermediate zoom position. The maximum amounts of movement of the fourth lens unit L4 and the fifth lens unit L5 are −22.3 mm and −11.7 mm, respectively, at the intermediate zoom position. The value of the conditional expression (2) at this time falls within a range from 0.33 to 0.62. In this manner, since the locus which is prevented from significant departing from the movement locus of the third lens unit L3 is employed, the aberration variation caused by the movement of the rear lens group LR is reduced.

Because of the movement of the rear lens units arranged on the image side with respect to the third lens unit L3, this exemplary embodiment is designed to satisfy the conditional expression (1)=1.16, and the variable power of the second lens unit (variator lens unit) is borne, so that the aberration variation of the curvature of field at the time of zooming is reduced. Other points are the same as those of Exemplary embodiment 1.

Exemplary Embodiment 4

Referring now to FIG. 7, a zoom lens of Exemplary embodiment 4 of this disclosure will be described below. The zoom type of Exemplary embodiment 4 is the same as that of Exemplary embodiment 1. The configuration of the first lens unit L1 is the same as that of Exemplary embodiment 1. The lens configuration of the second lens subunit L1b for focusing is also the same as that of Exemplary embodiment 1.

This exemplary embodiment has a high optical performance such as having a specification of high magnification with a zoom ratio as high as 11.5, but having a low aberration variation. The aperture stop SP is arranged between the third lens unit L3 and the fourth lens unit L4. The fourth lens unit L4 corresponds to the lens unit Ls. The aperture stop SP is moved integrally with the fourth lens unit L4 to the object side at the time of zooming from the wide-angle end to the telephoto end.

The aperture stop SP may be driven to the object side separately (along the different locus from those of other lens units) at the time of zooming. As regards the rear lens group LR, the fifth lens unit L5 has a magnification increasing effect of approximately 11.7 times at the time of zooming from the wide-angle end to the telephoto end. The fourth lens unit L4 moves so as to correct the deviation of the paraxial image plane position caused by the movement of the fifth lens unit L5.

In this exemplary embodiment, as regards the fourth lens unit L4, the amount of movement of the fourth lens unit L4 becomes maximum with reference to the position of the wide-angle end at −10.5 mm (the sign "−" indicates the movement to the object side) at the intermediate zoom position. The maximum amounts of movement of the fifth lens unit L5 is −4.4 mm at the intermediate zoom position, and the value of the conditional expression (2) is 0.42. In this manner, since the locus which is prevented from significant departing from the movement locus of the fourth lens unit L4 is employed, the aberration variation caused by the movement of the rear lens group is reduced.

Because of the movement of the rear lens units arranged on the image side with respect to the fourth lens unit L4, this exemplary embodiment is designed to satisfy the conditional expression (1)=1.08, and the variable power of the second lens unit (variator lens unit) is borne. Accordingly, the aberration variation of the curvature of field at the time of zooming is reduced. Other points are the same as those of Exemplary embodiment 1. The zoom lenses of Exemplary embodiments 1 to 4 may be configured to electrically correct a distortion amount when being used in the image pickup apparatus provided with the image pickup element configured to convert an optical image formed on a light-receiving surface into an electric signal.

Although the preferred exemplary embodiments of this disclosure have been described thus far, this disclosure is not limited to those exemplary embodiments, and various modifications or variations may be made within the scope of this disclosure.

FIG. 9 is a schematic drawing of a principal portion of the image pickup apparatus (TV camera system) using the zoom lens of Exemplary embodiments 1 to 4 as an image pickup optical system. In FIG. 9, reference numeral 101 denotes a zoom lens of one of Exemplary embodiments 1 to 4. Reference numeral 124 denotes a camera. The zoom lens 101 is demountably mountable with respect to the camera 124. Reference numeral 125 denotes an image pickup apparatus configured by mounting the zoom lens 101 on the camera 124. Reference numerals 114 and 115 denote drive mechanisms such as a helicoid or a cam, which is configured to drive the respective lens units in the direction of the optical axis, respectively.

Reference numerals 116 and 117 denote motors (driving device) configured to electrically drive the drive mechanisms 114 and 115 and an aperture stop (not illustrated). Although not illustrated in FIG. 9, there are provided a detector such as an encoder, a potentiometer, or a photo sensor for detecting the positions of the respective lens units on the optical axis or an aperture diameter of the aperture stop. Reference numeral 109 denotes a glass block which corresponds to an optical filter or a color split prism in the camera 124, reference numeral 110 denotes a solid-state image pickup element (photo-electric conversion element) such as a CCD sensor or a CMOS sensor configured to receive an image of an object formed by the zoom lens 101. Reference numeral 111 and 122 denotes CPUs configured to control driving of the camera 124 and the zoom lens 101. In this manner, by applying the zoom lens of this disclosure to the TV camera, the image pickup apparatus with a high optical performance is realized.

Numerical examples 1 to 4 corresponding to Exemplary embodiments 1 to 4 of this disclosure will be illustrated below. In the respective numerical examples, i indicates the order of the surface from the object side, $r_i$ indicates a radius of curvature of an i-th surface from the object side, $d_i$ indicates an interval between the i-th surface and na i+1th surface from the object side, and $nd_i$ and $vd_i$ indicate a refractive power and Abbe number of an i-th optical member. Three surfaces closest to the image are surfaces of the glass block.

The focal length, the F number, and the angle of view (degrees) indicate values when focusing on an infinity object. BF indicates a back focus, and is expressed by a distance from the last surface (glass block surface) to the image surface. The aspherical surface shape is expressed by an expression $$X=(H^2/R)/[1+[1-(1+K)(H/R)^2]^{1/2}]+A4H^4+A6H^6+A8H^8+A10H^{10},$$

where the direction of optical axis is X-axis, a direction perpendicular to the optical axis is H-axis, a direction of travel of light is positive, R is a paraxial curvature radius, k is an eccentricity, and A4, A6, A8, and A10 are coefficients of aspherical surface, respectively.

For example, an expression "e−Z" means "$10^{-z}$". Then, the relationship between the respective conditional expressions and the values in the numerical examples are shown in Table.

Numerical Example 1

| Unit mm | | | | | |
|---|---|---|---|---|---|
| Surface data | | | | | |
| Surface number | r | d | nd | vd | Effective Diameter |
| 1 | 196.578 | 3.80 | 1.77250 | 49.6 | 158.29 |
| 2 | 94.834 | 24.61 | | | 137.21 |
| 3 | 438.686 | 3.30 | 1.71300 | 53.9 | 136.73 |
| 4 | 186.532 | 24.38 | | | 131.05 |
| 5 | −232.900 | 3.20 | 1.69680 | 55.5 | 129.54 |
| 6 | 387.879 | 0.20 | | | 129.26 |
| 7 | 218.577 | 15.33 | 1.84666 | 23.8 | 130.27 |

-continued

Unit mm

| | | | | | |
|---|---|---|---|---|---|
| 8 | −1457.607 | 4.72 | | | 129.58 |
| 9 | −500.097 | 8.63 | 1.49700 | 81.5 | 128.76 |
| 10 | −206.143 | 0.15 | | | 128.31 |
| 11 | −1725.295 | 22.35 | 1.51633 | 64.1 | 122.24 |
| 12 | −109.692 | 3.60 | 1.69895 | 30.1 | 121.23 |
| 13 | −225.917 | 20.26 | | | 122.96 |
| 14 | 212.315 | 3.80 | 1.74950 | 35.3 | 118.38 |
| 15 | 103.489 | 21.72 | 1.49700 | 81.5 | 115.66 |
| 16 | −2744.339 | 0.20 | | | 115.58 |
| 17 | 180.844 | 19.12 | 1.43387 | 95.1 | 115.04 |
| 18 | −242.755 | 0.20 | | | 114.35 |
| 19 | 130.297 | 8.56 | 1.43387 | 95.1 | 104.00 |
| 20 | 300.000 | (variable) | | | 102.70 |
| 21 | 88.254 | 1.80 | 1.77250 | 49.6 | 45.09 |
| 22 | 34.999 | 9.76 | | | 39.55 |
| 23 | −57.822 | 1.80 | 1.59240 | 68.3 | 39.38 |
| 24 | 81.946 | 0.05 | 1.61937 | 19.2 | 37.74 |
| 25 | 50.827 | 8.82 | | | 37.42 |
| 26 | −50.321 | 2.95 | 1.59240 | 68.3 | 37.62 |
| 27 | −281.311 | 2.96 | | | 39.82 |
| 28 | 241.016 | 6.17 | 1.76182 | 26.6 | 42.33 |
| 29 | −68.202 | (variable) | | | 42.77 |
| 30 (stop) | ∞ | 2.75 | | | 36.36 |
| 31* | 191.537 | 2.83 | 1.49700 | 81.5 | 37.32 |
| 32 | −1287.606 | 0.25 | | | 37.58 |
| 33 | 43.567 | 3.60 | 1.76182 | 26.6 | 38.55 |
| 34 | 60.603 | 0.65 | | | 37.91 |
| 35 | 69.534 | 2.00 | 1.77250 | 49.6 | 37.91 |
| 36 | 44.450 | (variable) | | | 37.03 |
| 37 | 487.924 | 6.05 | 1.61800 | 63.3 | 48.69 |
| 38 | −92.839 | 0.20 | | | 48.92 |
| 39 | 1125.343 | 2.00 | 1.78590 | 44.2 | 48.31 |
| 40 | 48.424 | 11.25 | 1.49700 | 81.5 | 47.47 |
| 41 | −114.983 | (variable) | | | 47.73 |
| 42 | 449.990 | 10.15 | 1.49700 | 81.5 | 47.40 |
| 43 | −42.235 | 1.80 | 1.77250 | 49.6 | 47.22 |
| 44* | −479.326 | 0.20 | | | 48.47 |
| 45 | 74.188 | 12.40 | 1.43387 | 95.1 | 49.75 |
| 46 | −54.538 | (variable) | | | 49.74 |
| 47 | ∞ | 50.00 | 1.69680 | 55.5 | 50.00 |
| 48 | ∞ | 19.00 | 1.51633 | 64.2 | 50.00 |
| 49 | ∞ | 16.56 | | | 50.00 |
| image plane | ∞ | | | | |

Aspherical Surface Data

31st surface

K = 0.00000e+000   A4 = −9.57947e−007   A6 = −6.53262e−011
A8 = −2.00710e−013

44th surface

K = 0.00000e+000   A4 = 4.28288e−007   A6 = 2.77206e−010
A8 = −5.06765e−015   A10 = 1.71241e−016

Data
Zoom Ratio 11.54

| | Wide Angle | Intermediate | Telephoto |
|---|---|---|---|
| Focal Length | 10.21 | 56.31 | 117.88 |
| F number | 1.87 | 1.79 | 1.78 |
| Half Angle of View (degrees) | 38.07 | 8.09 | 3.88 |
| Image Height | 8.00 | 8.00 | 8.00 |
| Total Length of Lens | 555.0 | 555.0 | 555.0 |
| BF | 16.56 | 16.56 | 16.56 |
| d20 | 1.30 | 97.55 | 121.61 |
| d29 | 140.68 | 25.82 | 3.81 |
| d36 | 45.00 | 51.27 | 59.53 |
| d41 | 0.55 | 1.90 | 0.55 |
| d46 | 3.37 | 14.33 | 5.41 |
| Position of Entrance Pupil | 105.49 | 270.10 | 431.95 |
| Exit Pupil Position | 495.49 | 273.55 | 189.06 |
| Front Principal Point Position | 115.92 | 338.75 | 630.39 |
| Rear Principal Point Position | 6.34 | −39.77 | −101.31 |

Zoom Lens Unit Data

| Unit | Starting Surface | Focal Length | Lens Configuration Length | Front Principal Point Position | Rear Principal Point Position |
|---|---|---|---|---|---|
| 1 | 1 | 116.22 | 188.13 | 125.10 | 57.13 |
| 2 | 21 | −39.17 | 34.31 | 0.18 | −35.52 |
| 3 | 30 | 354.31 | 12.08 | −19.28 | −26.24 |
| 4 | 37 | 145.35 | 19.50 | 7.55 | −5.28 |
| 5 | 42 | 101.20 | 24.56 | 14.90 | −1.95 |
| GB | 47 | ∞ | 69.00 | 21.00 | −21.00 |

Single Lens Data

| Lens | Starting Surface | Focal Length |
|---|---|---|
| 1 | 1 | −241.11 |
| 2 | 3 | −457.65 |
| 3 | 5 | −208.40 |
| 4 | 7 | 225.44 |
| 5 | 9 | 698.84 |
| 6 | 11 | 225.81 |
| 7 | 12 | −309.00 |
| 8 | 14 | −273.47 |
| 9 | 15 | 201.17 |
| 10 | 17 | 242.18 |
| 11 | 19 | 522.91 |
| 12 | 21 | −76.20 |
| 13 | 23 | −56.95 |
| 14 | 24 | −216.23 |
| 15 | 26 | −103.94 |
| 16 | 28 | 70.39 |
| 17 | 31 | 335.70 |
| 18 | 33 | 186.38 |
| 19 | 35 | −165.24 |
| 20 | 37 | 126.71 |
| 21 | 39 | −64.44 |
| 22 | 40 | 70.16 |
| 23 | 42 | 78.22 |
| 24 | 43 | −60.06 |
| 25 | 45 | 74.62 |
| 26 | 47 | 0.00 |
| 27 | 48 | 0.00 |

Numerical Example 2

Unit mm

Surface data

| Surface number | r | d | nd | vd | Effective Diameter |
|---|---|---|---|---|---|
| 1 | 416.261 | 3.80 | 1.77250 | 49.6 | 160.00 |
| 2 | 134.491 | 25.46 | | | 143.16 |
| 3 | −604.422 | 3.30 | 1.71300 | 53.9 | 142.65 |
| 4 | 329.155 | 19.17 | | | 137.52 |
| 5 | −275.227 | 3.20 | 1.62588 | 35.7 | 136.56 |
| 6 | 174.858 | 0.20 | | | 137.21 |
| 7 | 175.650 | 21.24 | 1.84666 | 23.8 | 137.31 |
| 8 | −490.525 | 2.34 | | | 137.12 |
| 9 | −4001.058 | 15.55 | 1.49700 | 81.5 | 134.48 |
| 10 | −171.876 | 0.20 | | | 133.83 |
| 11 | 275.860 | 23.12 | 1.49700 | 81.5 | 114.67 |
| 12 | −137.665 | 3.60 | 1.75520 | 27.5 | 110.36 |
| 13 | −1443.944 | 20.22 | | | 107.32 |
| 14 | −3040.709 | 9.72 | 1.49700 | 81.5 | 103.22 |
| 15 | −201.805 | 0.20 | | | 103.18 |
| 16 | 182.049 | 8.15 | 1.43387 | 95.1 | 99.22 |
| 17 | 736.717 | 0.20 | | | 98.17 |

-continued

Unit mm

| | | | | | |
|---|---|---|---|---|---|
| 18 | 114.757 | 8.65 | 1.43387 | 95.1 | 94.33 |
| 19 | 300.000 | (variable) | | | 93.24 |
| 20 | 93.273 | 1.80 | 1.77250 | 49.6 | 46.72 |
| 21* | 31.289 | 12.29 | | | 39.99 |
| 22 | −42.710 | 1.80 | 1.59240 | 68.3 | 39.55 |
| 23 | 92.388 | 0.05 | 1.61937 | 19.2 | 38.91 |
| 24 | 56.590 | 9.20 | | | 38.80 |
| 25 | −49.131 | 2.95 | 1.59240 | 68.3 | 39.36 |
| 26 | −78.437 | 0.00 | | | 41.63 |
| 27 | 189.335 | 6.36 | 1.76182 | 26.6 | 43.88 |
| 28 | −76.386 | (variable) | | | 44.31 |
| 29 (stop) | ∞ | 1.70 | | | 37.41 |
| 30* | 92.452 | 3.65 | 1.49700 | 81.5 | 38.39 |
| 31 | 995.144 | 1.00 | | | 38.50 |
| 32 | 271.139 | 3.86 | 1.76182 | 26.6 | 38.68 |
| 33 | −183.244 | 0.10 | | | 38.72 |
| 34 | −713.528 | 2.00 | 1.77250 | 49.6 | 38.60 |
| 35 | 106.458 | (variable) | | | 38.40 |
| 36 | 409.851 | 6.84 | 1.61800 | 63.3 | 47.73 |
| 37 | −75.559 | 0.20 | | | 47.89 |
| 38 | −378.018 | 2.00 | 1.78590 | 44.2 | 46.84 |
| 39 | 51.614 | 10.33 | 1.49700 | 81.5 | 45.98 |
| 40 | −126.505 | (variable) | | | 46.24 |
| 41 | −316.280 | 9.37 | 1.49700 | 81.5 | 46.39 |
| 42 | −37.987 | 1.80 | 1.77250 | 49.6 | 46.53 |
| 43* | −194.516 | 0.20 | | | 49.04 |
| 44 | 79.083 | 14.53 | 1.43387 | 95.1 | 51.91 |
| 45 | −46.420 | (variable) | | | 52.21 |
| 46 | ∞ | 50.00 | 1.69680 | 55.5 | 50.00 |
| 47 | ∞ | 19.00 | 1.51633 | 64.2 | 50.00 |
| 48 | ∞ | 18.92 | | | 50.00 |
| image plane | ∞ | | | | |

Aspherical Surface Data

21st surface

K = −1.20785e+000  A4 = 3.77465e−006  A6 = 1.88124e−009
A8 = −1.20334e−012  A10 = 1.89627e−016

30th surface

K = 0.00000e+000  A4 = −1.23178e−006  A6 = −5.73316e−011
A8 = −1.86650e−013

43rd surface

K = 0.00000e+000  A4 = 1.10743e−006  A6 = 5.89070e−010
A8 = 9.57550e−014  A10 = 2.88773e−016

Data
Zoom Ratio 11.54

| | Wide Angle | Intermediate | Telephoto |
|---|---|---|---|
| Focal Length | 10.07 | 63.78 | 116.22 |
| F Number | 1.87 | 1.87 | 1.85 |
| Half Angle of View (degrees) | 38.47 | 7.15 | 3.94 |
| Image Height | 8.00 | 8.00 | 8.00 |
| Total Length of Lens | 555.0 | 555.0 | 555.0 |
| BF | 18.92 | 18.92 | 18.92 |
| d19 | 1.30 | 98.06 | 120.94 |
| d28 | 157.62 | 14.43 | 3.81 |
| d35 | 45.00 | 54.46 | 56.77 |
| d40 | 1.84 | 22.68 | 16.25 |
| d45 | 1.00 | 17.13 | 8.97 |
| Position of Entrance Pupil | 101.93 | 266.50 | 420.59 |
| Exit Pupil Position | 495.60 | 181.82 | 189.12 |
| Front Principal Point Position | 112.21 | 355.24 | 616.18 |
| Rear Principal Point Position | 8.85 | −44.87 | −97.29 |

-continued

Unit mm

Zoom Lens Unit Data

| Unit | Starting Surface | Focal Length | Lens Configuration Length | Front Principal Point Position | Rear Principal Point Position |
|---|---|---|---|---|---|
| 1 | 1 | 125.08 | 168.31 | 118.10 | 51.87 |
| 2 | 20 | −38.62 | 34.45 | −0.20 | −36.10 |
| 3 | 29 | 270.10 | 12.31 | −4.73 | −12.93 |
| 4 | 36 | 170.17 | 19.38 | 7.40 | −5.29 |
| 5 | 41 | 97.97 | 25.89 | 18.38 | 1.20 |
| GB | 46 | ∞ | 69.00 | 21.00 | −21.00 |

Single Lens Data

| Lens | Starting Surface | Focal Length |
|---|---|---|
| 1 | 1 | −258.72 |
| 2 | 3 | −298.45 |
| 3 | 5 | −170.37 |
| 4 | 7 | 155.03 |
| 5 | 9 | 360.86 |
| 6 | 11 | 188.27 |
| 7 | 12 | −201.74 |
| 8 | 14 | 434.42 |
| 9 | 16 | 554.84 |
| 10 | 18 | 422.38 |
| 11 | 20 | −61.73 |
| 12 | 22 | −49.06 |
| 13 | 23 | −235.93 |
| 14 | 25 | −230.60 |
| 15 | 27 | 72.19 |
| 16 | 30 | 204.80 |
| 17 | 32 | 144.06 |
| 18 | 34 | −119.79 |
| 19 | 36 | 103.79 |
| 20 | 38 | −57.67 |
| 21 | 39 | 75.21 |
| 22 | 41 | 85.91 |
| 23 | 42 | −61.42 |
| 24 | 44 | 69.86 |
| 25 | 46 | 0.00 |
| 26 | 47 | 0.00 |

Numerical Example 3

Unit mm

Surface data

| Surface number | r | d | nd | vd | Effective Diameter |
|---|---|---|---|---|---|
| 1 | 361.696 | 3.80 | 1.77250 | 49.6 | 159.55 |
| 2 | 133.554 | 25.16 | | | 143.25 |
| 3 | −686.009 | 3.30 | 1.71300 | 53.9 | 142.72 |
| 4 | 257.032 | 20.25 | | | 136.59 |
| 5 | −302.504 | 3.20 | 1.62588 | 35.7 | 135.74 |
| 6 | 157.527 | 0.20 | | | 136.40 |
| 7 | 159.231 | 25.39 | 1.84666 | 23.8 | 136.42 |
| 8 | −461.321 | 5.00 | | | 135.98 |
| 9 | 1924.191 | 17.34 | 1.49700 | 81.5 | 131.14 |
| 10 | −192.662 | 0.50 | | | 129.60 |
| 11 | 304.320 | 24.20 | 1.49700 | 81.5 | 114.49 |
| 12 | −136.783 | 3.60 | 1.75520 | 27.5 | 112.23 |
| 13 | −9381.687 | 21.93 | | | 110.07 |
| 14 | 4350.218 | 11.20 | 1.49700 | 81.5 | 106.41 |
| 15 | −194.249 | 0.20 | | | 106.39 |
| 16 | 172.595 | 8.70 | 1.43387 | 95.1 | 101.72 |
| 17 | 593.983 | 0.20 | | | 100.46 |
| 18 | 115.276 | 9.89 | 1.43387 | 95.1 | 96.17 |
| 19 | 300.000 | (variable) | | | 94.23 |

-continued

Unit mm

| | | | | | |
|---|---|---|---|---|---|
| 20 | 116.180 | 1.80 | 1.77250 | 49.6 | 44.85 |
| 21* | 30.080 | 11.75 | | | 38.29 |
| 22 | −41.394 | 1.80 | 1.59240 | 68.3 | 37.93 |
| 23 | 134.631 | 0.05 | 1.61937 | 19.2 | 37.93 |
| 24 | 68.092 | 8.28 | | | 37.92 |
| 25 | −53.424 | 2.95 | 1.59240 | 68.3 | 38.64 |
| 26 | −77.843 | 0.00 | | | 40.64 |
| 27 | 207.766 | 6.73 | 1.76182 | 26.6 | 42.89 |
| 28 | −72.915 | (variable) | | | 43.45 |
| 29 (stop) | ∞ | 1.70 | | | 36.22 |
| 30* | 86.033 | 3.57 | 1.49700 | 81.5 | 36.79 |
| 31 | 957.032 | 1.02 | | | 36.75 |
| 32 | 257.468 | 3.81 | 1.76182 | 26.6 | 36.72 |
| 33 | −168.024 | 0.10 | | | 36.61 |
| 34 | −255.067 | 2.00 | 1.77250 | 49.6 | 36.49 |
| 35 | 108.090 | (variable) | | | 36.18 |
| 36 | 396.052 | 6.44 | 1.61800 | 63.3 | 45.71 |
| 37 | −78.716 | 0.20 | | | 46.02 |
| 38 | 343.311 | 2.00 | 1.78590 | 44.2 | 45.40 |
| 39 | 43.519 | 10.41 | 1.49700 | 81.5 | 44.43 |
| 40 | −161.270 | (variable) | | | 44.63 |
| 41 | −208.053 | 8.56 | 1.49700 | 81.5 | 44.33 |
| 42 | −37.341 | 1.80 | 1.77250 | 49.6 | 44.49 |
| 43* | −232.948 | 0.20 | | | 46.81 |
| 44 | 74.674 | 13.34 | 1.43387 | 95.1 | 49.24 |
| 45 | −46.845 | (variable) | | | 49.44 |
| 46 | ∞ | 50.00 | 1.69680 | 55.5 | 50.00 |
| 47 | ∞ | 19.00 | 1.51633 | 64.2 | 50.00 |
| 48 | ∞ | 18.93 | | | 50.00 |
| Image Plane | ∞ | | | | |

Aspherical Surface Data

21st Surface

K = 6.70668e−002  A4 = −1.67423e−006  A6 = 6.77529e−011
A8 = −5.26423e−012  A10 = 3.45588e−015

30th Surface

K = 0.00000e+000  A4 = −1.23692e−006  A6 = −9.05649e−011
A8 = −2.04338e−013

43rd surface

K = 0.00000e+000  A4 = 9.51534e−007  A6 = 5.18087e−010
A8 = 1.65307e−013  A10 = 2.70470e−016

Data
Zoom Ratio 11.54

| | Wide Angle | Intermediate | Telephoto |
|---|---|---|---|
| Focal Length | 10.21 | 62.41 | 117.80 |
| F number | 1.87 | 1.90 | 1.82 |
| Half Angle of View (degrees) | 38.09 | 7.30 | 3.89 |
| Image Height | 8.00 | 8.00 | 8.00 |
| Total Length of Lens | 555.0 | 555.0 | 555.0 |
| BF | 18.93 | 18.93 | 18.93 |
| d19 | 1.30 | 97.61 | 120.22 |
| d28 | 144.75 | 12.46 | 3.81 |
| d35 | 45.30 | 58.99 | 59.99 |
| d40 | 2.18 | 12.79 | 7.41 |
| d45 | 1.00 | 12.68 | 3.08 |
| Position of Entrance Pupil | 104.72 | 267.99 | 436.67 |
| Exit Pupil Position | 495.52 | 180.08 | 189.08 |
| Front Principal Point Position | 115.14 | 354.58 | 636.03 |
| Rear Principal Point Position | 8.71 | −43.50 | −98.86 |

-continued

Unit mm

Zoom Lens Unit Data

| Unit | Starting Surface | Focal Length | Lens Configuration Length | Front Principal Point Position | Rear Principal Point Position |
|---|---|---|---|---|---|
| 1 | 1 | 118.69 | 184.07 | 122.18 | 52.26 |
| 2 | 20 | −39.35 | 33.36 | −1.87 | −37.22 |
| 3 | 29 | 354.20 | 12.19 | −9.41 | −17.31 |
| 4 | 36 | 124.35 | 19.05 | 5.40 | −7.07 |
| 5 | 41 | 110.86 | 23.89 | 18.83 | 3.30 |
| GB | 46 | ∞ | 69.00 | 21.00 | −21.00 |

Single Lens Data

| Lens | Starting Surface | Focal Length |
|---|---|---|
| 1 | 1 | −276.10 |
| 2 | 3 | −261.86 |
| 3 | 5 | −165.06 |
| 4 | 7 | 142.48 |
| 5 | 9 | 353.33 |
| 6 | 11 | 193.40 |
| 7 | 12 | −183.83 |
| 8 | 14 | 374.44 |
| 9 | 16 | 557.26 |
| 10 | 18 | 424.61 |
| 11 | 20 | −53.03 |
| 12 | 22 | −53.24 |
| 13 | 23 | −222.50 |
| 14 | 25 | −301.01 |
| 15 | 27 | 71.59 |
| 16 | 30 | 189.95 |
| 17 | 32 | 133.98 |
| 18 | 34 | −98.04 |
| 19 | 36 | 106.81 |
| 20 | 38 | −63.60 |
| 21 | 39 | 70.14 |
| 22 | 41 | 90.07 |
| 23 | 42 | −57.80 |
| 24 | 44 | 68.63 |
| 25 | 46 | 0.00 |
| 26 | 47 | 0.00 |

Numerical Example 4

Unit mm

Surface data

| Surface number | r | d | nd | vd | Effective Diameter |
|---|---|---|---|---|---|
| 1 | 352.242 | 3.80 | 1.69680 | 55.5 | 165.11 |
| 2 | 104.041 | 24.36 | | | 141.26 |
| 3 | 637.609 | 3.30 | 1.69680 | 55.5 | 140.85 |
| 4 | 241.306 | 21.69 | | | 136.40 |
| 5 | −270.969 | 3.20 | 1.69680 | 55.5 | 135.05 |
| 6 | 424.805 | 0.20 | | | 134.75 |
| 7 | 220.267 | 14.95 | 1.72825 | 28.5 | 135.84 |
| 8 | −1297.462 | 2.34 | | | 135.45 |
| 9 | −2221.241 | 13.08 | 1.43387 | 95.1 | 134.33 |
| 10 | −199.457 | 0.10 | | | 134.29 |
| 11 | −3132.723 | 21.50 | 1.48749 | 70.2 | 132.60 |
| 12 | −122.985 | 3.60 | 1.68893 | 31.1 | 132.34 |
| 13 | −248.191 | 9.69 | | | 133.40 |

-continued

Unit mm

| | | | | | |
|---|---|---|---|---|---|
| 14 | 185.080 | 3.80 | 1.72342 | 38.0 | 125.55 |
| 15 | 97.997 | 22.25 | 1.49700 | 81.6 | 120.60 |
| 16 | 929.628 | 0.20 | | | 120.26 |
| 17 | 187.599 | 19.28 | 1.43387 | 95.1 | 119.60 |
| 18 | −271.215 | 0.20 | | | 118.85 |
| 19 | 121.483 | 8.92 | 1.59240 | 68.3 | 107.24 |
| 20 | 247.406 | (variable) | | | 105.65 |
| 21 | 63.329 | 1.50 | 1.81600 | 46.6 | 46.86 |
| 22 | 35.592 | 9.44 | | | 41.76 |
| 23 | −90.312 | 1.40 | 1.81600 | 46.6 | 41.42 |
| 24 | 46.868 | 8.03 | | | 38.64 |
| 25 | −87.428 | 9.82 | 1.61340 | 44.3 | 38.79 |
| 26 | −25.142 | 1.40 | 1.61800 | 63.4 | 39.37 |
| 27 | 872.297 | 0.20 | | | 41.98 |
| 28 | 105.329 | 6.82 | 1.64769 | 33.8 | 42.87 |
| 29 | −83.603 | (variable) | | | 43.01 |
| 30 | −47.573 | 1.70 | 1.78800 | 47.4 | 31.63 |
| 31 | 125.887 | 3.54 | 1.84666 | 23.9 | 33.78 |
| 32 | −209.511 | (variable) | | | 34.48 |
| 33 (stop) | ∞ | 1.50 | | | 37.19 |
| 34 | −596.974 | 5.46 | 1.66672 | 48.3 | 38.02 |
| 35 | −58.235 | 0.20 | | | 39.01 |
| 36 | 133.032 | 5.19 | 1.48749 | 70.2 | 40.32 |
| 37 | −136.840 | 2.49 | | | 40.47 |
| 38 | −69.613 | 4.40 | 1.61405 | 55.0 | 40.43 |
| 39 | −48.950 | 1.80 | 1.80400 | 46.6 | 41.02 |
| 40 | −109.606 | (variable) | | | 42.20 |
| 41 | 265.255 | 7.53 | 1.49700 | 81.5 | 51.82 |
| 42 | −87.563 | 0.20 | | | 51.97 |
| 43 | −356.110 | 2.00 | 1.83400 | 37.2 | 51.29 |
| 44 | 56.431 | 11.07 | 1.49700 | 81.5 | 50.91 |
| 45 | −151.517 | 2.10 | | | 51.43 |
| 46 | 232.953 | 7.82 | 1.52249 | 59.8 | 52.06 |
| 47 | −87.749 | 1.80 | 1.80100 | 35.0 | 52.08 |
| 48 | −223.497 | 0.20 | | | 52.51 |
| 49 | 56.707 | 8.88 | 1.49700 | 81.5 | 52.49 |
| 50 | −768.316 | (variable) | | | 51.83 |
| 51 | ∞ | 50.00 | 1.69680 | 55.5 | 50.00 |
| 52 | ∞ | 19.00 | 1.51633 | 64.2 | 50.00 |
| 53 | ∞ | 12.34 | | | 50.00 |
| Image Plane | ∞ | | | | |

Data
Zoom Ratio 11.54

| | Wide Angle | Intermediate | Telephoto |
|---|---|---|---|
| Focal Length | 9.94 | 50.77 | 114.74 |
| F number | 1.84 | 1.81 | 1.89 |
| Half Angle of View (degrees) | 38.83 | 8.95 | 3.99 |
| Image Height | 8.00 | 8.00 | 8.00 |
| Total Length of Lens | 542.8 | 542.8 | 542.8 |
| BF | 12.34 | 12.34 | 12.34 |
| d20 | 1.30 | 89.63 | 111.72 |
| d29 | 112.55 | 12.41 | 2.81 |
| d32 | 12.25 | 13.60 | 1.58 |
| d40 | 44.83 | 50.92 | 48.94 |
| d50 | 7.60 | 11.95 | 13.44 |
| Position of Entrance Pupil | 102.27 | 271.59 | 442.84 |
| Exit Pupil Position | 576.99 | 343.85 | 393.29 |

-continued

Unit mm

| | | | |
|---|---|---|---|
| Front Principal Point Position | 112.39 | 330.13 | 592.14 |
| Rear Principal Point Position | 2.40 | −38.43 | −102.40 |

Zoom Lens Unit Data

| Unit | Starting Surface | Focal Length | Lens Configuration Length | Front Principal Point Position | Rear Principal Point Position |
|---|---|---|---|---|---|
| 1 | 1 | 113.41 | 176.45 | 115.37 | 48.85 |
| 2 | 21 | −40.91 | 38.61 | 0.05 | −37.55 |
| 3 | 30 | −84.31 | 5.24 | −1.01 | −3.93 |
| 4 | 33 | 80.47 | 21.04 | 4.94 | −9.86 |
| 5 | 41 | 70.99 | 41.61 | 19.95 | −8.82 |
| GB | 51 | ∞ | 69.00 | 21.00 | −21.00 |

Single Lens Data

| Lens | Starting Surface | Focal Length |
|---|---|---|
| 1 | 1 | −213.24 |
| 2 | 3 | −559.08 |
| 3 | 5 | −236.98 |
| 4 | 7 | 259.64 |
| 5 | 9 | 504.08 |
| 6 | 11 | 261.98 |
| 7 | 12 | −358.06 |
| 8 | 14 | −293.28 |
| 9 | 15 | 218.47 |
| 10 | 17 | 258.88 |
| 11 | 19 | 392.57 |
| 12 | 21 | −102.07 |
| 13 | 23 | −37.64 |
| 14 | 25 | 54.28 |
| 15 | 26 | −39.52 |
| 16 | 28 | 73.00 |
| 17 | 30 | −43.63 |
| 18 | 31 | 93.33 |
| 19 | 34 | 96.40 |
| 20 | 36 | 139.25 |
| 21 | 38 | 248.43 |
| 22 | 39 | −111.49 |
| 23 | 41 | 133.40 |
| 24 | 43 | −58.28 |
| 25 | 44 | 84.22 |
| 26 | 46 | 123.02 |
| 27 | 47 | −181.43 |
| 28 | 49 | 106.64 |
| 29 | 51 | 0.00 |
| 30 | 52 | 0.00 |

TABLE

| Numerical Example | Conditional Expression (1) | Conditional Expression (2) Lens Unit arranged on Image Side of Lens Unit Ls | mr | Lens Unit Ls | ms | mr/ms | Conditional Expression (3) | Conditional Expression (4) |
|---|---|---|---|---|---|---|---|---|
| 1 | 1.076 | Fourth Lens Unit L4 | −12.3 | Third Lens Unit L3 | −18.6 | 0.66 | 3.39 | 1.14~1.37 |
|   |       | Fifth Lens Unit L5  | −11.0 |                    |       | 0.59 |      |           |
| 2 | 1.480 | Fourth Lens Unit L4 | −37.0 | Third Lens Unit L3 | −46.4 | 0.80 | 2.43 | 1.14~1.41 |
|   |       | Fifth Lens Unit L5  | −16.1 |                    |       | 0.35 |      |           |
| 3 | 1.157 | Fourth Lens Unit L4 | −22.3 | Third Lens Unit L3 | −36.0 | 0.62 | 3.05 | 1.14~1.39 |
|   |       | Fifth Lens Unit L5  | −11.7 |                    |       | 0.33 |      |           |
| 4 | 1.085 | Fifth Lens Unit L5  | −4.4  | Fourth Lens Unit L4 | −10.5 | 0.42 | 3.01 | 1.12~1.20 |

*Numerical Values of Conditional Expression (4) indicates Minimum Value and Maximum Value in Total Zoom Range.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-210034, filed Oct. 7, 2013, which is hereby incorporated by reference herein in its entirety.

What is claimed is:

1. A zoom lens comprising, in an order from an object side to an image side:
a front lens group;
an aperture stop; and
a rear lens group having a plurality of lens units, wherein
the front lens group includes a first lens unit having a positive refractive power and a second lens unit having a negative refractive power in this order from the object side to the image side,
the interval between the lens units adjacent to each other varies at the time of zooming,
the first lens unit is fixed at the time of zooming,
the first lens unit includes a first lens subunit having a negative refractive power, which is fixed at the time of focusing and a second lens subunit having a positive refractive power, which moves at the time of focusing, wherein the second lens subunit is arranged at a position adjacent to the first lens subunit on the image side,
the rear lens group includes a lens unit moving in a direction of an optical axis so that an imaging magnification at a telephoto end is larger than an imaging magnification at a wide-angle end, and
wherein the aperture stop and a lens unit Ls arranged at a position adjacent to the aperture stop on the image side move along the same locus, which is convex toward the object side, at the time of zooming from the wide-angle end to the telephoto end, and, where the variable magnification ratio of the rear lens group is expressed as Zr, the amount of movement of the lens unit Ls at the time of zooming from the wide-angle end to a zoom position where the lens unit Ls is positioned at the most object side is expressed as ms, and the amount of movement of the lens unit arranged on the image side of the lens unit Ls at the time of zooming from the wide-angle end to a zoom position where the lens unit Ls is positioned at the most object side is expressed as mr, conditional expressions, $1.157 \leq Zr < 1.70$ $0.2 < mr/ms < 1.2$ are satisfied.

2. The zoom lens according to claim 1, wherein the aperture stop moves to the object side at the time of zooming from the wide-angle end to the telephoto end.

3. The zoom lens according to claim 1, wherein
the rear lens group includes a lens unit moving in a direction of an optical axis at the time of zooming so that an imaging magnification at a telephoto end is smaller than an imaging magnification at a wide-angle end.

4. The zoom lens according to claim 1, further comprising:
a third lens subunit having a positive refractive power, which is fixed at the time of focusing on the image side of the second lens subunit in the first lens unit.

5. The zoom lens according to claim 1, wherein
where the second lens subunit includes a positive lens, a positive lens, and a negative lens arranged from the object side to the image side in this order, and a focal length of the second lens subunit is expressed as f1b, and a focal length of the first lens unit is expressed as f1, conditional expression $1 < f1b/f1 < 5$ is satisfied.

6. The zoom lens according to claim 1, wherein all the lens units which constitute the rear lens group have a positive refractive power.

7. The zoom lens according to claim 1, wherein all of the lens units included in the rear lens group move at the time of zooming.

8. The zoom lens according to claim 1, wherein
where a distance from the aperture stop to a front principle plane position of the rear lens group on the optical axis is 0r1, and a focal length of the rear lens group is fr, the conditional expression $0.8 < 0r1/fr < 1.8$ is satisfied in the entire zoom range.

9. The zoom lens according to claim 1, wherein
the rear lens group includes a third lens unit having a positive refractive power, a fourth lens unit having a positive refractive power, and a fifth lens unit having a positive refractive power in this order from the object side to the image side, and the third lens unit, the fourth lens unit, and the fifth lens unit move at the time of zooming.

10. The zoom lens according to claim 1, further comprising:
a third lens unit having a positive refractive power on the image side of the second lens unit, wherein the rear lens group includes a fourth lens unit having a positive refractive power, and a fifth lens unit having a positive refractive power in this order from the object side to the image side, and the third lens unit, the fourth lens unit, and the fifth lens unit move at the time of zooming.

11. An image pickup apparatus comprising:
a zoom lens according to claim 1; and
a solid-state image pickup element configured to receive an image formed by the zoom lens.

* * * * *